(12) United States Patent
Govindassamy

(10) Patent No.: US 10,154,472 B1
(45) Date of Patent: Dec. 11, 2018

(54) METHOD AND APPARATUS FOR PAGING INFORMATION TRANSMISSION

(71) Applicant: MBIT WIRELESS, INC., Irvine, CA (US)

(72) Inventor: Sivakumar Govindassamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 73 days.

(21) Appl. No.: 15/296,571

(22) Filed: Oct. 18, 2016

(51) Int. Cl.
| | |
|---|---|
| *H04W 84/12* | (2009.01) |
| *H04W 68/02* | (2009.01) |
| *H04W 36/00* | (2009.01) |
| *H04W 76/28* | (2018.01) |
| *H04W 84/04* | (2009.01) |
| *H04W 88/08* | (2009.01) |
| *H04W 4/80* | (2018.01) |

(52) U.S. Cl.
CPC ....... *H04W 68/02* (2013.01); *H04W 36/0072* (2013.01); *H04W 76/28* (2018.02); *H04W 4/80* (2018.02); *H04W 84/042* (2013.01); *H04W 88/08* (2013.01)

(58) Field of Classification Search
CPC ....... H04L 12/28; H04L 12/46; H04L 12/741; H04L 12/2801; H04L 12/4675; H04W 4/00; H04W 84/12; H04W 92/14; H04W 84/042; H04W 88/08; H04W 24/02; H04W 4/80; H04W 16/22; H04W 16/20; H04W 52/02; H04W 48/10; H04W 36/00
See application file for complete search history.

(56) References Cited

U.S. PATENT DOCUMENTS

| | | | | |
|---|---|---|---|---|
| 7,444,150 | B2 * | 10/2008 | Rick | H04W 60/04 455/432.1 |
| 8,219,118 | B2 * | 7/2012 | Kim | H04W 68/00 455/458 |
| 8,521,194 | B2 * | 8/2013 | Laroia | H04W 76/14 455/458 |
| 8,806,530 | B1 | 8/2014 | Izdepski et al. | |

(Continued)

OTHER PUBLICATIONS

U.S. Appl. No. 15/233,488, filed Aug. 10, 2016. Title: Method and Apparatus for Broadcast Information Transmission.

(Continued)

*Primary Examiner* — Hanh N Nguyen
(74) *Attorney, Agent, or Firm* — Lerner, David, Littenberg, Krumholz & Mentlik, LLP

(57) ABSTRACT

Internet, voice calls, and messaging services have become ubiquitous and the means by which the services are accessed varies widely. The number and types of devices that may use these services have also proliferated. To serve a number and variety of client devices, a mobile Hotspot may be used, which is a device that may include a modem for mobile broadband access and a short range wireless link to distribute the services to local devices which may have such connectivity. Power consumption of battery powered client devices is an important consideration. A method and apparatus are disclosed that enable a client device to receive paging information from the mobile networks through a mobile Hotspot over a short range wireless link which may reduce power consumption of client devices.

57 Claims, 19 Drawing Sheets

(56) References Cited

U.S. PATENT DOCUMENTS

| | | | |
|---|---|---|---|
| 9,119,153 B2* | 8/2015 | Deivasigamani | ............................ H04W 52/0245 |
| 9,998,898 B1* | 6/2018 | Govindassamy | ..... H04W 16/20 |
| 2008/0080407 A1 | 4/2008 | Abbate et al. | |
| 2009/0059795 A1 | 3/2009 | Fonseca, Jr. et al. | |
| 2009/0157799 A1 | 6/2009 | Sukumaran et al. | |
| 2012/0142328 A1 | 6/2012 | Awoniyi et al. | |
| 2013/0301451 A1 | 11/2013 | Siomina et al. | |
| 2014/0050086 A1 | 2/2014 | Himayat et al. | |
| 2014/0066132 A1 | 3/2014 | Burke et al. | |
| 2015/0018010 A1 | 1/2015 | Fischer | |
| 2015/0163041 A1 | 6/2015 | Kodali et al. | |
| 2015/0208457 A1 | 7/2015 | Thanayankizil et al. | |
| 2016/0227351 A1 | 8/2016 | Gu et al. | |

OTHER PUBLICATIONS

U.S. Appl. No. 15/290,664, filed Oct. 11, 2016. Title: Method and Apparatus for Measurements Information Transmission.

* cited by examiner

METHOD AND APPARATUS FOR PAGING INFORMATION TRANSMISSION

CROSS REFERENCE TO RELATED APPLICATIONS

This application is related to U.S. patent application Ser. No. 15/233,488 filed Aug. 10, 2016, and U.S. patent application Ser. No. 15/290,664, filed Oct. 11, 2016, the disclosures of which are hereby incorporated herein by reference.

BACKGROUND

Internet access is becoming ubiquitous and the means by which the access is obtained varies widely. For example, the internet access may be through a Digital Subscriber Line (DSL), a cable modem, a fiber optic network, a wireless communication network, etc. When the internet service provides high data rates it is often referred to as broadband internet service. Broadband internet service is generally understood to be a service that is always on and offers data rates in the order of mega-bits per second for both download and upload.

A client device as defined in the present disclosure is a device that may access the internet from one or more of the sources from which the internet service may be available. Such client devices may include conventional devices such as a smartphone, a tablet, a feature-phone, a laptop or a desktop personal computer, etc. Other client devices may include devices that are embedded within devices that perform other functions such as an entertainment system in a home or in an automobile, a home appliance such as a refrigerator or washer/dryer, a wristwatch with a heart rate monitor, a medical device such as a blood pressure meter or insulin sensor, a utility meter, a gaming console, a camera, a navigation device, an industrial equipment, etc. These types of devices are collectively referred to herein as machine type client devices.

These diverse types of client devices may access the internet service directly through one of the sources of primary internet access mentioned earlier. Alternatively, the client devices may access the internet through a local network that performs distribution of the primary internet access to the users localized in a given area. Examples of such local networks include Local Area Network (LAN) using Ethernet, Wireless LAN (WLAN) commonly known as Wi-Fi, Bluetooth™, or some other local area networking schemes. Such short range wireless networks are referred to herein as Short Range Wireless Links (SRWL). When a client device is in the proximity of a location where such a SRWL access is available, it may access the internet using the SRWL. FIG. 1 illustrates an example scenario of client devices accessing internet over a WLAN SRWL, which is connected to a traditional wire-line internet service such as DSL or cable modem. The local area where WLAN service is available is often referred to as Hotspot. The device that offers the WLAN service in a given local area is referred to as an Access Point (AP). In the present disclosure, the terms Hotspot AP or Hotspot are used interchangeably to refer to the device that offers the WLAN service in a given local area.

A Hotspot AP may be connected to DSL or cable modem through any of the standardized interfaces such as Universal Serial Bus (USB), Ethernet, or proprietary interfaces. In some cases, the DSL or cable modem and the Hotspot AP may be part of a single physical device. In such cases the interface between the DSL or cable modem and AP may use Secure Digital Input Output (SDIO) or other suitable interface.

Client devices may also obtain internet access over mobile wireless communication networks. These mobile wireless networks are often referred to as Wireless Wide Area Network (WWAN). The internet service offered by such networks is often referred to as mobile broadband internet or Mobile Broadband (MB) and the mobile wireless networks are often referred to as mobile broadband networks. The terms WWAN and MB are used interchangeably herein.

As the variety of client devices has increased and the demand for MB access has increased, a device known as a mobile Hotspot is commonly used. A mobile Hotspot device may include both a modem for MB access and a WLAN AP (Hotspot AP) to distribute the internet to local client devices. FIG. 2 illustrates the block diagram of an example mobile Hotspot device. As shown in FIG. 2, for the chosen example, the MB modem and the Hotspot AP may be connected to each other via one of the standard interfaces used in the industry such as USB, SDIO, or proprietary interfaces. In another mobile Hotspot example, the MB modem and the WLAN AP may be a single Integrated Circuit (IC) as shown in FIG. 3.

Some mobile Hotspot devices may serve as a single function device, i.e., they only perform the mobile Hotspot function. Such mobile Hotspots may take many different form factors such as a mobile Hotspot integrated into an automobile, a standalone device that can be carried around with or without a battery, integrated into an accessory device for a tablet, a standalone device that can be powered by a wall outlet, etc.

Some client devices have multiple capabilities and being a Hotspot is one of the capabilities. For example, a smartphone may have a mobile broadband modem that may be used to get mobile internet service directly from the mobile broadband network as illustrated in FIG. 4. The flow of data is as shown in FIG. 4 from the mobile broadband modem to the application processor that processes the download and upload data and interacts with the user via the display and other elements of the user interface such as audio, vibration, etc. The smartphone may also have a WLAN modem to access internet service over a Hotspot AP. When it is in the vicinity of a Hotspot AP, it may use internet service from the Hotspot as illustrated in FIG. 1. In another smartphone example, the mobile broadband modem, the WLAN AP and the Application Processor may be integrated into a single Integrated Circuit (IC) as shown in FIG. 5.

A smartphone may also serve as a mobile Hotspot to provide internet service over WLAN to other client devices in its vicinity. FIG. 6 illustrates an example scenario where the smartphone serves as a mobile Hotspot and provides internet service to a machine type client device which may have only a WLAN access. In another smartphone mobile Hotspot example, the mobile broadband modem, the WLAN AP and the Application Processor may be integrated into a single IC as shown in FIG. 7.

An example of a mobile broadband network is the Long Term Evolution (LTE) from the $3^{rd}$ Generation Partnership Project (3GPP). The LTE technology and its evolution are often referred to as fourth generation (4G) technologies. A client device may also use any of the previous generation technologies such as "2G", "3G" from 3GPP and other standardization bodies. A client device may also use future generation technologies for Hotspot, mobile Hotspot, and mobile networks.

Although a Hotspot or mobile Hotspot may be able to obtain internet service and distribute it to multiple client devices in a given local area, it may not be able to provide other key services that users commonly use. For example, voice calls and SMS based text messaging remain two of the most commonly used applications in client devices. A client device accessing internet through a Hotspot or mobile Hotspot may still be receiving voice calls or SMS based text messages directly through the WWAN as illustrated in FIG. 8. Four interconnected networks are shown in FIG. 8: Public Switch Telephone Network (PSTN) 802, WWAN 804, internet 806, and WLAN (Hotspot) 808. The PSTN is connected to the WWAN through the interface 820 and to the internet through the interface 822. The WWAN and internet are connected through the interface 818. The Cable modem 812 is connected to the internet through the interface 824. These interfaces may use open industry standards or may use proprietary standards. The Hotspot, in the present example, is connected to the internet using a Cable modem interface. In the present example, the Smartphone 811 is connected to the Hotspot Access Point 810 for internet service through the Cable modem 812. Simultaneously, it is also connected to the WWAN 804 for voice calls and SMS based text messaging. The Smartphone 811 may exchange SMS based text messages with the Smartphone 814 over the WWAN 804. The Smartphone 811 may have voice calls with the landline phone 816 through WWAN 804 and PSTN 802. The cordless phone 826 may access the conventional landline voice service through the cordless base 828 which in turn is connected to the PSTN 802 though the conventional landline interface 830. The coverage area 808 of the WLAN Hotspot and the coverage area 832 of the cordless base 832 may partially or fully overlap.

Although aspects of the present disclosure are illustrated using a particular type of mobile Hotspot, the disclosure may be applicable to other types of mobile Hotspot devices, some of which are listed in an earlier section of the present disclosure. In the remainder of the present disclosure a mobile Hotspot is used as an example. A mobile Hotspot may obtain the primary internet service through a cable modem, DSL or MB modem. When a mobile Hotspot is an area where it may receive primary internet service from cable modem or DSL, it may use the internet service from that source. When a mobile Hotspot is an area where it does not have access to receive primary internet service from cable modem or DSL, it may use the internet service from WWAN. When a client device is receiving internet service from a mobile Hotspot, it may still be connected to the WWAN for receiving other services such as voice calls, SMS, etc.

Typically, as shown in FIG. 9, a WWAN comprises elements such as client devices or mobile stations and one or more base stations. Other network devices may also be employed, such as a mobile switching center (not shown). As illustrated in FIG. 9, the communication path from the base station (BS) to the client device or mobile station (MS) is referred to herein as a downlink (DL) direction or downlink channel. The communication path from the client device to the base station is referred to herein as an uplink (UL) direction or uplink channel. In some wireless communication systems, the MS communicates with the BS in both the DL and UL directions. For instance, such communication is carried out in cellular telephone systems. In other wireless communication systems, the client device communicates with the base stations in only one direction, usually the DL. Such DL communication may occur in applications such as paging. Typically in a wireless communication system, the client device and the base station may transmit information in blocks of data and such a block of data is referred to herein as a "message."

A base station to which the client device may be downlink synchronized and/or communicating with at any given time is referred to herein as the Serving Base Station (SBS). In some wireless communication systems the serving base station may be referred to as the serving cell. The base stations that are in the vicinity of the serving base station are called Neighbor Base Stations (NBS). Similarly, in some wireless communication systems a neighbor base station may be referred to as a neighbor cell.

A client device, after initially synchronizing with a cell, may switch to another cell depending on the signal conditions, network congestion, and other criteria. The process of switching from one cell to another cell by a client device is often referred to as handover (HO) or cell reselection. In some wireless communication systems handover is also referred to as handoff. Also in some wireless communication systems cell reselection is also referred to as idle mode handoff. An NBS, to which a client device may be switching over its communication from the current SBS, is herein referred to as Target Base Station (TBS). In some wireless communication systems, a target base station is normally referred to as a target cell. Sometimes, during a handover, the serving cell and the target cell may be the same and only the channel used for communication may be changed. Such a handover, in which the cell is not changed, is called an intra-cell handover. The purpose of intra-cell handover may be that the new channel is better suited for communication than the previous channel within the same cell. Cell reselections or handovers amongst cells that use the same frequency are referred to herein as intra-frequency cell reselection or handover. Cell reselections or handovers amongst cells that use different frequencies are referred to herein as intra-frequency cell reselection or handover. A network may use different Radio Access Technologies (RATs) for providing various services. In a particular network, the cells of different RAT types may be overlapping or adjacent to each other. If a neighbor cell is using a RAT type that is different from the RAT type used by the serving cell, it is referred to as an inter-RAT neighbor cell.

The decision making process for handovers and cell reselections varies from one wireless communication system to another. However, the decisions are generally based on the signal conditions measurements by the client devices and reporting of those measurements to the wireless communication network by the client devices. The wireless communication network generally may influence and control the measurements and reporting process of the client device by providing parameters for the measurement and reporting process. The actual decision to perform handover may be made either by the wireless communication network or by the client device depending on the type of particular wireless communication system. On the other hand the cell reselection decisions in idle mode (i.e., when client device is not in active communication with the wireless communication network) may be generally performed autonomously by the client device. Both handovers and cell reselections may normally lead to change of cell from which the client device may access communication services. The difference between the handover procedure and cell reselection procedure depends generally on whether a client device is engaged in an active communication with the wireless communication network.

Normally, certain types of system information may be required by all client devices so that they may communicate with the wireless communication network. The system information typically includes system synchronization information, system parameters, resource allocation information, paging information, etc. The wireless communication network may transmit such system information as broadcast data so that all client devices within its coverage area may be able to receive. Such information is herein referred to as "broadcast messages."

Typically in a wireless communication system a base station may group the system information and each group of system information may be transmitted as multiple broadcast messages and such broadcast messages are herein referred as system parameter messages. The system parameter messages may carry important system information without which the client device may not be able to communicate with the wireless communication network. The wireless communication network may transmit these system parameter messages at regular intervals in such a way that any client device that enters its coverage area may receive these system parameter messages and may be able to communicate with the wireless communication network at the earliest possible time. Client devices that are already in the base station's coverage area may also periodically receive these system parameter messages for possible updates. Normally a client device may store the system parameter messages in its memory for the current SBS.

Typically, in wireless communication systems, most of the system parameter messages may not change frequently. For example, some system parameter messages may change once or twice a day and some system parameter messages may not change for many days.

In some wireless communication systems, when a client device switches to a new base station due to cell reselection or handover, it may be required to receive the system parameter messages for the new SBS and certain system parameter messages for the selective list of NBSs corresponding to the new SBS.

The set of all system parameter messages broadcast by a base station is herein referred to as "base station broadcast system information." The individual block of system information message may be referred to as System Information Block (SIB). Two or more SIBs may be grouped and sent as a single System Information (SI) message. There may be different SIBs describing different groups of system parameters such as SIB Type1 (SIB1), SIB Type2 (SIB2), etc. The SI for one or more cells may be periodically updated by the network. To ensure that the client devices are using the correct version of the SI, a field referred to herein as "change-mark" is generally included in the SI messages. Client devices may store the change-mark of the SIs it has decoded. If the new SI is transmitted by a cell, it may increment the change-mark to enable the client device to detect that it needs to acquire the newly updated SI. The change-mark of the newly acquired SI is then used as latest version for detecting any future changes in the SI. The change-mark field may be incremented in modulo arithmetic to keep the field bit-width to a minimum. For example, the change-mark may be incremented modulo-8 and the value may be represented by a 3-bit wide field.

In idle mode, a client device for the most part may turn off a majority of its circuitry to reduce power consumption. This is often referred to as "sleep" state, a sub-state within the idle mode. A client device may remain in a sleep state for a long duration and may wake up at the desired time window when it expects to receive the paging messages and certain SIB s. This alternating sequence of sleep and wake-up in idle mode is referred to herein as Discontinuous Reception (DRX). The sleep and wake-up sequence may follow a regular pattern and its period is often referred to as DRX cycle. The success rate for the incoming calls (e.g., mobile terminated voice calls and/or data calls) in a client device is directly related to the successful reception of paging messages. Normally, in idle mode, in addition to the reception of paging messages and SIB messages, a client device may continue to search and monitor neighbor cells.

When a client device performs a network registration procedure to get service from a cell, it decodes the system information broadcast in the cell. The client device may store such system information. The system information carries important information regarding the cell reselection criteria. Such information includes but not limited to the tracking area identity (TAI), Public Land Mobile Network Identity (PLMN ID) which uniquely identifies a particular network operator, Closed Subscriber Group Identity (CSG ID), RAT type, neighbor cell frequencies, etc. This information may help to decide whether a cell is a "suitable cell" for the client device to avail all the services offered by it, or the cell is an "acceptable cell" where the client device may avail only limited services such as emergency calls. The client device may have to perform the network registration procedure to get service from the network and for the network to be able to page the client device for mobile terminated (incoming) calls. The network registration procedure may be typically performed by a client device with a particular cell. A group of cells in the geographic vicinity of each other may form a registration area. A registration area may be identified based on the system information of a cell. For example, the Tracking Area Codes (TACs) of a group of cells in a registration area may be the same.

Each base station in a wireless communication network may be identified by a unique identifier referred to herein as Cell Identity (CID). The CID of a base station may become known to a client device when it decodes SI from the base station. To avoid unnecessary updates from a client device and yet ensure the ability to reach a client device at any given time, the network may organize a group of cells into a "tracking area" and use a Tracking Area Identity (TAI) to identify the various groups of cells. This is illustrated in FIG. 10 where four different tracking areas are illustrated. A cell may broadcast information about the tracking area it belongs to by including the TAI information in the system information. A client device may be required to inform the network when it begins to receive service from a cell that belongs to a tracking area that is different from the tracking area of the cells from which it was previously receiving service. The process of informing the network that the client device has begun receiving service from a cell that belongs to a new tracking area is referred to herein as Tracking Area Update (TAU) procedure. With this method, a client device performs TAU only when there is a change in TAI of the cell from which it is getting service. For example, in FIG. 10, when a client device reselects from the cell with CID=1003 to the cell with CID=1007 which has the same TAI, it may not perform TAU procedure. However, when the client device reselects from the cell with CID=1007 and TAI=200 to the cell with CID=1012 and TAI=201, it may perform TAU procedure.

As long as a client device is in the same registration area, the client device may not perform network registration procedure again except that a periodic network registration update procedure may need to be performed even if the client device continues to move within the same registration area. If the client device moves to a cell which does not belong to the registration area in which the client device is registered, then the client device may perform network registration procedure to get access to and service from the network.

When a client device is in idle mode, the network may only be aware of the location of the client device at the registration area level. In order for a network to page a client device, it may need to send the paging message in all cells belonging to the same registration area. The instances for paging message transmission, known as paging occasions (POs), are usually derived based on a client device's unique identity and a DRX cycle or paging cycle. The network may transmit a paging message addressed to a specific client device in its specific paging occasion. When a client device performs cell reselection, the exact instances of paging occasions may be different in the new serving cell. Depending on the exact timing of the cell reselection and the timing of the POs in the old serving cell and the new serving cell, the client device may potentially miss a paging message or may receive it with delay. A single paging message received in a single PO may include multiple paging records to page multiple client devices. Different client devices may be identified within a paging message by using their respective unique identities in the paging records. For example, International Mobile Subscriber Identity (IMSI) may be used for the identity, or in case of 3GPP LTE wireless communication system, System Architecture Evolution (SAE)-Temporary Mobile Subscriber Identity (S-TMSI) may be used.

When a client device is connected to a mobile Hotspot for internet service, it still may be connected to a WWAN for other services such as voice and SMS. The client device and the mobile Hotspot may be camped on the same cell of the same WWAN, and both the devices may be decoding the paging information. This may be an inefficient method of reception since most of the client devices which are connected to the mobile Hotspot may be camped on the same cell of the same WWAN.

SUMMARY

A method and apparatus are disclosed such that a mobile Hotspot may be the only device that decodes the paging information from the WWAN and relays the WWAN paging information to the client devices over the SRWL only when there is match of client device identity in the paging records. This may enable the client devices to avoid having to decode the paging information directly from the WWAN. As power consumption of client devices may be more critical, the relaying of the paging information from the mobile Hotspot may be a more power efficient method for a client device.

In accordance with an aspect of the present disclosure, a method for communication of paging information in a wireless communication network may include: controlling, by a processing device, at a hotspot device, when a determination is the hotspot device and a client device are currently camped on a same cell of a same Radio Access Technology (RAT) type on a same frequency, monitoring and decoding a paging message from a Wireless Wide Area Network (WWAN) addressed to the client device, wherein the monitoring and decoding includes transmitting a request to the client device for decoding information required for the decoding of the paging message and receiving the decoding information from the client device; and entering into a Cellular Paging Decoded and Transmitted over Short Range Wireless Links (SRWL) mode (CPDTOS) with the client device, in which the client device disables paging message decode related processing as long as the client device is connected to and is in the CPDTOS mode with the hotspot device.

In one alternative, the decoding information may include at least one of a client device identity, a Discontinuous Reception (DRX) cycle or second information necessary for the hotspot device to derive a Paging Occasion (PO) of the client device and successfully decode a paging record in the paging message from the WWAN.

In one alternative, the client device identity includes at least one of an International Mobile Subscriber Identity (IMSI) or a System Architecture Evolution (SAE)-Temporary Mobile Subscriber Identity (S-TMSI).

In one alternative, the method may include controlling, by the processing device, at the hotspot device, when the currently camped on cell is changed in the hotspot device or the client device, communication with the client device to determine whether to continue in or exit the CPDTOS mode with the client device.

In one alternative, the hotspot device may be configured to connect with a plurality of first client devices including the client device over the SRWL and enter the CPDTOS mode with more than one of the first client devices concurrently, and the method may include controlling, by the processing device, at the hotspot device, receiving a Paging Details Information Response message from each of a plurality of second client devices of the first client devices; determining a Paging Occasion (PO) time instance for each of the second client devices; when a determination is the PO time instances do not overlap with each other or other scheduled downlink processing for the WWAN at the hotpot device, transmitting an Enter CPDTOS mode Request message to each of the second client devices to enter the CPDTOS mode; when at least one third client device of the second client devices determined to be camped on to a same first cell, Cell $C_a$, of a same first RAT type, on a same first frequency, has the PO time instance overlapping with another PO time instance at the hotspot device, transmitting an Enter CPDTOS mode Request message to the at least one third client device having the PO time instance thereof overlapping the another PO time instance at the hotspot device and using a single PO time instance to decode more than one given client device paging message; and transmitting the Enter CPDTOS mode Request messages only to at least one fourth client device of the second client devices for which the PO time instance thereof is determined not to overlap with any given PO time instance at the hotspot device.

In one alternative, the hotspot device may be configured to connect with a plurality of first client devices including the client device over the SRWL and enter the CPDTOS mode with more than one of the first client devices concurrently, and the method may further include controlling, by the processing device, at the hotspot device, when the hotspot device and at least one second client device of the first client devices are currently camped on to different cells $C_a$ and $C_b$, respectively, of a same first RAT type on a same first frequency, determining whether a paging message from the cell $C_b$ is decodable, when a determination is the paging message from the Cell $C_b$ is not decodable, not initiating entry into the CPDTOS mode for the at least one second client device, and maintaining or entering into the CPDTOS mode with at least one third client device of the first client devices determined to be camped on to the cell $C_a$; when a determination is the paging message from the Cell $C_b$ is decodable, initiating entry into the CPDTOS mode for the at least one second client device by transmitting an Enter CPDTOS mode Request" to the at least one second client device and receiving from the at least one second client device an Enter CPDTOS mode Confirm message; when the Enter CPDTOS mode Confirm message is received from the at least one second client device, decoding the paging message respectively of the at least one second client device in a respective Paging Occasion (PO) time instance and determining whether a paging record matches with an identity of the at least one second client device in a decoded paging message; when a given paging record is determined to match with the identity of a given client device of the second client devices, transmitting a Matching Paging Record Received Indication message to the given client device; and when an Exit CPDTOS mode Request message, transmitted by the given client device when the given client device is in an idle mode of operation, is received at the hotspot device, transmitting the Exit CPDTOS mode Response message to the given client device and stopping the monitoring and decoding the PO corresponding to the given client device.

In one alternative, the method may include controlling, by the processing device, at the hotspot device, when a cell reselection is determined at the hotspot device, communication with the at least one second client device to determine whether to continue in or exit the CPDTOS mode with the at least one second client device.

In one alternative, the hotspot device may be configured to connect with a plurality of first client devices including the client device over the SRWL and enter the CPDTOS mode with more than one of the first client device concurrently, and the method may further include controlling, by the processing device, at the hotspot device, when the hotspot device and at least one second client device of the first client devices are currently camped on cells $C_{f1}$ and $C_{f2}$ of a same first RAT type on different frequencies f1 and f2, respectively, determining whether a paging message from the cell $C_{f2}$ is decodable while the hotspot device is monitoring the frequency f1; when the hotspot device determines that the paging message from the cell $C_{f2}$ is not decodable, not initiating entry into the CPDTOS mode for the at least one second client device; and when the hotspot device determines that the paging message from the cell $C_{f2}$ is decodable, entering into the CPDTOS mode with the at least one second client device and monitoring a Paging Occasions (PO) and decoding given paging message from the cell $C_{f2}$.

In one alternative, the method may include, when the hotspot device determines that the paging message from the cell $C_{f2}$ is not decodable, controlling, by the processing device, at the hotspot device, maintaining the CPDTOS mode with each third client device of the at least one second client device (i) camped on the cell $C_{f1}$ or (ii) camped on a cell other the cell $C_{f1}$ on the frequency f1.

In one alternative, the method may include, when the hotspot device determines that the paging message from the cell $C_{f2}$ is not decodable, controlling, by the processing device, at the hotspot device, decoding the paging message in the respective PO time instance and in the decoded paging message determining whether a given paging record matches with an identity of given client device of the at least one second client device; and when a determination is the given paging record matches an identity of the given client device, transmitting a Matching Paging Record Received Indication message to the given client device.

In one alternative, the method may include: controlling, by the processing device, at the hotspot device, receiving an Exit CPDTOS mode Request message from the given client device, which the given client device transmits in response to the Matching Paging Record Received Indication message and a determination to exit idle mode of operation and the CPDTOS mode with the hotspot device; and transmitting, based on the Exit CPDTOS mode Request message, an Exit CPDTOS mode Response message to the given client device and stopping monitoring and decoding the PO corresponding to the given client device.

In one alternative, the method may include controlling, by the processing device, at the hotspot device, when a cell reselection is determined at the hotspot device, communication with the at least one second client device to determine whether to continue in or exit the CPDTOS mode with the at least one second client device.

In one alternative, the hotspot device may be configured to connect with a plurality of first client devices including the client device over the SRWL and enter the CPDTOS mode with more than one of the first client device concurrently, and the method may include controlling, by the processing device, at the hotspot device, when the hotspot device and at least one second client device of the first client devices are currently camped on cells $C_{RAT1}$ and $C_{RAT2}$ of different first and second RAT types RAT1 and RAT2, respectively, determining whether (i) the RAT2 and frequencies used by the RAT2 are supported by the hotspot device, and (ii) a paging message from the cell $C_{RAT2}$ is decodable while the hotspot device is monitoring the cell $C_{RAT1}$ of the RAT type RAT1; and when the hotspot device determines that the paging message from the cell $C_{RAT2}$ is not decodable, not initiating entry into the CPDTOS mode for the at least one second client device; and when the hotspot device determines that the paging message from the cell $C_{RAT2}$ is decodable, entering into the CPDTOS mode with the at least one second client device and decoding given paging messages of the at least one second client device in respective Paging Occasions (POs) time instances, determining from the decoded given paging messages whether a given paging record matches with an identity of the at least one second client device; and when a determination is a given paging record matches the identity of at least one third client device of the at least one second client device, transmitting a Matching Paging Record Received Indication message to the at least one third client device.

In one alternative, the method may include, when the hotspot device determines that the paging message from the cell $C_{RAT2}$ is not decodable, controlling, by the processing device, at the hotspot device, maintaining the CPDTOS mode with each third client device of the at least one second client device camped on (i) the cell $C_{RAT1}$ or (ii) a cell other the cell $C_{RAT1}$ having the RAT type RAT1 and a same or different frequency as the cell $C_{RAT1}$.

In one alternative, the method may include: controlling, by the processing device, at the hotspot device, receiving an Exit CPDTOS mode Request message from the at least one third client device, which the at least one third client device transmits in response to the Matching Paging Record Received Indication message and a determination at the at least one third client device to exit idle mode of operation and the CPDTOS mode with the hotspot device; and transmitting, based on the Exit CPDTOS mode Request message, an Exit CPDTOS mode Response message to the at least one third client device and stopping monitoring and decoding the PO corresponding to the at least one third client device.

In one alternative, the method may include controlling, by the processing device, at the hotspot device, when a cell reselection is determined at the hotspot device, communication with the at least one second client device to determine whether to continue in or exit the CPDTOS mode with each of the at least one second client device.

In one alternative, the hotspot device may be configured to connect with a plurality of first client devices including the client device over the SRWL and enter the CPDTOS mode with more than one of the first client device concurrently, and the method further may include controlling, by the processing device, at the hotspot device, when a determination is the hotspot device in agreement with the first client devices on monitoring and decoding of paging messages for given agreed client devices of the first client devices camped on a same cell or different cells on different frequencies or different RAT types, monitoring Paging Occasions (POs) in downlink for each given agreed client device of the different frequencies and the RAT types and managing a downlink monitoring schedule for the different cells respectively.

In one alternative, the hotspot device may be configured to connect with a plurality of first client devices including the client device over the SRWL and enter the CPDTOS mode with more than one of the first client device concurrently, and the method further may include controlling, by the processing device, at the hotspot device, when an overlap in Paging Occasions (POs) of different cells in same or different frequencies and RAT types is determined for at least one second device of the first client devices, transmitting a Paging Details Information Request message requesting the at least one second client device to change a Discontinuous Reception (DRX) cycle so as to determine whether a change in the DRX cycle changes the POs at the at least one second client device to avoid the overlap in the POs; receiving a Paging Details Information Response message from the at least one second client device, when the DRX cycle of the at least one second client device is changed; and when a determination at the hotspot device is there are not any non-overlapping POs for the at least one second client device camped on a given cell of the same or different frequencies and RAT types, communicating a result of the determination to the at least one second client device and not entering or exiting the mode for the at least one second client device.

In one alternative, the hotspot device may be configured to connect with a plurality of first client devices including the client device over the SRWL and enter the CPDTOS mode with more than one of the first client device concurrently, and the method may include controlling, by the processing device, at the hotspot device, when a determination at the hotspot device is an overlap with Paging Occasions (POs) of given cells of a same or different frequencies and RAT types to be monitored for at least one second client device of the first client devices with which the hotspot device is in the CPDTOS mode, based on an attempt by the hotspot device to decode paging message for the at least one second client device, executing one of: 1) prioritizing given cells of the same frequency and RAT type to which the hotspot device is camped on; and for other cells on other frequencies and RAT types for which an overlap of POs of at least one third client device of the first client device is determined, communicating to the at least one third client device that decoding of a next PO for at least one third client device is uncertain, requesting the at least one third client device to perform PO decoding and continuing to be in the CPDTOS mode with the at least one third client device; 2) prioritizing PO decoding of cells having frequencies and RAT types other than a frequency and RAT type of cells on which the hotspot device is camped and deferring system information (SI) decoding of the cells on which the hotspot device is camped, and determining whether to defer the SI decoding when delayed decoding of the SI is determined not to impact normal operation and performance of the hotspot device; 3) determining a priority for deciding which of given client devices the PO can be monitored and which other client devices the PO monitoring can be cancelled, based on a priority request from a given client device determined based on a current state of the given client device for PO monitoring; and 4) when the PO overlap is detected at the hotspot device, deciding using predetermined priorities set on client devices and at least one of RAT types or the frequencies for PO monitoring, at least one third client device for which to monitor the PO and at least one fourth client device for which to cancel monitoring of the PO.

In one alternative, the method may include, when 1) is executed: When the request for the PO decoding and to continue to be in the CPDTOS mode is denied by the at least one third client device, controlling, by the processing device, at the hotspot device, exiting the CPDTOS mode with the client device; and controlling, by the processing device, at the hotspot device, when an ongoing SI decode is completed at the hotspot device and non-overlapping POs are determined for at least one given client device of the first client devices for which the hotspot device previously exited the CPDTOS or the CPDTOS mode is not entered because the overlap in the PO previously due to the SI decode, transmitting a WWAN Camped on Cell Information Request or an Enter CPDTOS mode request to the at least one given client device requesting entry into the CPDTOS mode.

In one alternative, the priority request may be based on battery level of a battery operated client device having a predetermined battery level and (ii) a comparison to another client device for which power saving is not considered and which monitors own PO.

In one alternative, the priority request may be communicated in a Paging Details Information Response message.

In one alternative, the method may include controlling, by the processing device, at the hotspot device, transmitting, to the client device, in a WWAN Camped-on Cell Information Request message, information on Cell $C_x$, on which the hotspot device is currently camped, including at least one of first RAT type, first frequency or first Cell Identity (CID); and when a WWAN Camped-on Cell Information Response message is received from the client device, in which the WWAN Camped-on Cell Information Response message is transmitted by the client device when the client device determines a relative time offset exists between Cell $C_y$, on which the client device is camped and the Cell $C_x$ and indicates an estimate of a relative time offset $RTO_{xy}$, using the $RTO_{xy}$ to expedite timing synchronization with the Cell $C_y$ and increase speed of decoding paging message in the Cell $C_y$.

In one alternative, the hotspot device may be configured to connect with a plurality of first client devices including the client device over the SRWL and enter the CPDTOS mode with more than one of the first client device concurrently, and the method further may include controlling, by the processing device, at the hotspot device, when the hotspot device includes M receiver/decoder circuits, decoding in parallel overlapping Paging Occasions (POs) and system information (SIs) from N cells of same or different frequencies and RAT types, in which M and N are the same or different.

In one alternative, the method may include controlling, by the processing device, at the hotspot device, at any point of time, communicating with the client device and exiting the CPDTOS mode.

In one alternative, the method may include controlling, by the processing device, at the hotspot device, when the hotspot device fails to decode a given paging message in any given Paging Occasion (PO) for the client device, notifying the client device of the failure to decode and exiting the CPDTOS mode with the client device.

In one alternative, the method may include controlling, by the processing device, at the hotspot device, when given paging messages in respective Paging Occasion (PO) time instances are decoded at the hotspot device and a determination is a paging record for the client device has no match in a given decoded paging message, transmitting a No Matching Paging Record Received Indication message to the client device to indicate to the client device to refresh a counter or timer to continue to maintain status of the client device with the WWAN.

In one alternative, the method may include controlling, by the processing device, at the hotspot device, transmitting a Matching Paging Record Received Indication message to the client device when a matching paging record is detected in a given paging message of the client device.

In one alternative, the method may include controlling, by the processing device, at the hotspot device, when a new client device is connected with the hotspot device or system information (SI) in the serving cell of the hotspot device is updated or change and updated SI is successfully decoded at the hotspot device, entering the CPDTOS mode autonomously and starting broadcasting a Paging Details Information Request message.

In one alternative, the hotspot device may be pre-configured with a set of second cells of same or different frequencies, and given RAT type for which the hotspot device at least one of monitors or decodes Paging Occasions (POs) from the respective second cells.

In one alternative, the hotspot device may determine whether to transmit a Matching Paging Record Received Indication message to at least one second client device of a plurality first client devices including the client device, with which the hotspot device is configured to connect over the SRWL and enter the CPDTOS mode, using a first application being executed in the hotspot device and a second application being executed in the at least one second client device, in which the first and second applications communicate through a peer to peer protocol on any logical channel of an SRWL being used, in which the first and second applications are independent of the SRWL being used and achieved through a first virtual communication port established in the hotspot device and a second virtual communication port established in the at least one second client device, and in which the SRWL is mapped to the first and second virtual communication ports and the first and second applications communicate using the first and second virtual communication ports.

In one alternative, the method may include controlling, by the processing device, at the hotspot device, creating a new physical or logical channel as a Cellular Paging Message Communication Channel (CPMCC), which is pre-negotiated and dedicated for the CPDTOS mode, in which the CPMCC has a periodicity and time slot in which the hotspot device is to broadcast a Matching Paging Record Received Indication message to at least one second client device of a plurality first client devices including the client device, with which the hotspot device is configured to connect over the SRWL and enter the CPDTOS mode, in which the at least one second client device is to monitor the CPMCC on a predetermined agreed upon periodicity and time slot to receive a paging record from the hotspot device, and in which the CPMCC is used by the hotspot device and the at least one second client device for cellular network information exchange other than by communication of the Matching Paging Record Received Indication message from the hotspot device to the at least one second client device.

In one alternative, the hotspot device may include more than one primary source of internet including at least one of a cable modem or a Wireless Wide Area Network (WWAN) modem.

In one alternative, the hotspot device may use the cable modem to provide internet service while using the WWAN modem only for monitoring and decoding of Paging Occasions (POs).

In one alternative, the method may include controlling, by the processing device, at the hotspot device, when the hotspot and the client device are in the CPDTOS mode, a cell change occurs in the hotspot device or the client device, the hotspot device is not able to continue the CPDTOS mode with the client device, transmitting an Exit CPDTOS mode Request to and exiting the CPDTOS mode with the client device.

In one alternative, the method may include controlling, by the processing device, at the hotspot device, when the hotspot device and the client device are in the CPDTOS mode, a Paging Occasion (PO) to be monitored for a serving cell of the hotspot device is changed, and the hotspot device is not able to continue the CPDTOS mode with the client device, transmitting an Exit CPDTOS mode Request to and exiting the CPDTOS mode with the client device.

In one alternative, the method may include controlling, by the processing device, at the hotspot device, when a first change in a default Discontinuous Reception (DRX) cycle or paging cycle is detected at the client device, in which the first change is based on detection of a change in a Paging Occasion (PO) of a serving cell of the client device such that the hotspot device is not able to continue to monitor a new PO because of overlap in given PO, is communicated to the hotspot device, transmitting an Exit CPDTOS mode Request to the client device and exiting the CPDTOS mode with the client device.

In one alternative, the method may include controlling, by the processing device, at the hotspot device, receiving, over the communication connection, a WWAN broadcast information message transmitted from the client device, responsive to a second WWAN broadcast information message transmitted from the hotspot device, wherein the first and second WWAN broadcast information messages indicate first and second WWAN capabilities respectively of the hotspot device and the client device.

In one alternative, the method may include controlling, by the processing device, at the hotspot device, receiving a request from a client device to perform measurements on at least one of a serving cell or at least one neighbor cell of the client device indicated on a list transmitted with the request; determining a neighbor cell measurement schedule for the hotspot device; determining whether measurements are performable by the hotspot device on at least one given cell indicated on a list transmitted with a request from the client device; when the measurements are determined to be performable for at the least one given cell, communicating to the client device a positive acknowledgement with an indication of each first cell indicated in the list for which the measurements are determined to be performable; and when the measurement are determined not to be performable on any cell indicated in the list, communicating to the client device a negative acknowledgement with an indication the measurements are determined to be not performable for any of the cells indicated in the list.

In accordance with an aspect of the present disclosure, a method for communication of paging information in a wireless communication network may include: controlling, by a processing device, at a client device, when a determination is a hotspot device and the client device are currently camped on a same cell of a same Radio Access Technology (RAT) type on a same frequency, receiving a request from the hotspot device for decoding information required for decoding of a paging message from a Wireless Wide Area Network (WWAN) addressed to the client device; transmitting the decoding information to the hotspot device; and entering into a Cellular Paging Decoded and Transmitted over Short Range Wireless Links (SRWL) mode (CPDTOS) with the hotspot device, and disabling paging message decode related processing as long as the client device is connected to and is in the CPDTOS mode with the hotspot device.

In one alternative, the method may include controlling, by the processing device, at the client device, when the currently camped on cell is changed in the hotspot device or the client device, communication with the hotspot device to determine whether to continue in or exit the CPDTOS mode with the hotspot device.

In one alternative, the hotspot device may be configured to connect with a plurality of first client devices including the client device over the SRWL and enter the CPDTOS mode with more than one of the first client device concurrently, and the method may further include controlling, by the processing device, at the client device, when the hotspot device and at least one second client device of the first client devices are currently camped on to different cells $C_a$ and $C_b$, respectively, of a same first RAT type on a same first frequency, receiving an Enter CPDTOS mode Request from the hotspot device, when a determination at the hotspot device is a paging message from the Cell $C_b$ is decodable, entering into the CPDTOS mode with the hotspot device and transmitting an Enter CPDTOS mode Confirm message; receiving a Matching Paging Record Received Indication message from the hotspot device, when a determination at the hotspot device is a given paging record matches with an identity of the client device in a paging message decoded at the hotspot device; and analyzing the given paging record and taking action based on contents of the paging record.

In one alternative, the method may include, when the given paging record indicates an incoming voice call, controlling, by the processing device, at the client device, determining whether to initiate a procedure for establishing a connection with the respective WWAN; when the client device is in an idle mode of operation, exiting the CPDTOS mode with the hotspot device and transmitting the Exit CPDTOS mode Request message; and subsequently when the client reenters idle mode, entering the CPDTOS mode with the hotspot device.

In one alternative, the method may include controlling, by the processing device, at the client device, disabling monitoring and decoding of a Paging Occasion (PO) for the client device as long as the client device is connected to the hotspot device and has entered the CPDTOS mode; and when a cell reselection is determined in the client device, communication with the hotspot device to determine whether to continue in or exit the CPDTOS mode.

In one alternative, the hotspot device may be configured to connect with a plurality of first client devices including the client device over the SRWL and enter the CPDTOS mode with more than one of the first client device concurrently, and the method further may include controlling, by the processing device, at the client device, when the hotspot device and at least one second client device of the first client devices are currently camped on cells $C_{f1}$ and $C_{f2}$ of a same first RAT type on different frequencies f1 and f2, respectively, receiving a Matching Paging Record Received Indication message, when a determination at the hotspot device is a paging message from the cell $C_{f2}$ is decodable and a determination at the hotspot device is a given paging record matches with an identity of the client device in a paging message decoded at the hotspot device; and analyzing the given paging record and taking action based on contents of the paging record.

In one alternative, the method may include, when the given paging record indicates an incoming voice call, controlling, by the processing device, at the client device, determining whether to initiate a procedure for establishing a connection with a respective WWAN; when the client device is in an idle mode of operation, exiting the CPDTOS mode with the hotspot device and transmitting the Exit CPDTOS mode Request message; and subsequently when the client reenters idle mode, entering the CPDTOS mode with the hotspot device.

In one alternative, the method may include controlling, by the processing device, at the client device, disabling monitoring and decoding of a Paging Occasion (PO) for the client device as long as the client device is connected to hotspot device and has entered the CPDTOS mode; and when a cell reselection is determined in the client device, communication with the hotspot device to determine whether to continue in or exit the CPDTOS mode.

In one alternative, the hotspot device may be configured to connect with a plurality of first client devices including the client device over the SRWL and enter the CPDTOS mode with more than one of the first client device concurrently, and the method further may include controlling, by the processing device, at the client device, when the hotspot device and at least one second client device of the first client devices are currently camped on cells $C_{RAT1}$ and $C_{RAT2}$ of different first and second RAT types RAT1 and RAT2, respectively, receiving a Matching Paging Record Received Indication message, when a determination at the hotspot device is a paging message from the cell $C_{RAT2}$ is decodable and a determination at the hotspot device is a given paging record matches with an identity of the client device in a paging message decoded at the hotspot device; and analyzing the given paging record and taking action based on contents of the paging record.

In one alternative, the method may include, when the given paging record indicates an incoming voice call, controlling, by the processing device, at the client device, determining whether to initiate a procedure for establishing a connection with a respective WWAN; and when the client device is in an idle mode of operation, exiting the CPDTOS mode with the hotspot device and transmitting the Exit CPDTOS mode Request message; and subsequently when the client reenters idle mode, entering the CPDTOS mode with the hotspot device.

In one alternative, the method may include controlling, by the processing device, at the client device, disabling paging message decoding related processing as long as the client device is connected to the hotspot device and has entered the CPDTOS mode; and when a cell reselection is determined in the client device, communication with the hotspot device to determine whether to continue in or exit the CPDTOS mode.

In one alternative, the method may include controlling, by the processing device, at the client device, when a determination is the client device is out of range of or disconnected from the hotspot device, exiting the CPDTOS mode and starting decoding a Paging Occasion (PO) according a predetermined standard procedure.

In one alternative, the method may include controlling, by the processing device, at the client device, when the client device is disconnected from the hotspot device and the client device is not able to find another hotspot device for a current location of the client device, starting decoding of Paging Occasions (POs) directly from a Wireless Wide Area Network.

In one alternative, the method may include controlling, by the processing device, at the client device, when the client device enters the CPDTOS mode, turning off a Radio Frequency (RF) receiver of a cellular modem during a Paging Occasion (PO) time slot and entering a power save state.

In accordance with an aspect of the present disclosure, an apparatus for communication of paging information in a wireless communication network may include: circuitry configured to control, at a hotspot device, when a determination is the hotspot device and a client device are currently camped on a same cell of a same Radio Access Technology (RAT) type on a same frequency, monitoring and decoding a paging message from a Wireless Wide Area Network (WWAN) addressed to the client device, wherein the monitoring and decoding includes transmitting a request to the client device for decoding information required for the decoding of the paging message and receiving the decoding information from the client device; and entering into a Cellular Paging Decoded and Transmitted over Short Range Wireless Links (SRWL) mode (CPDTOS) with the client device, in which the client device disables paging message decode related processing as long as the client device is connected to and is in the CPDTOS mode with the hotspot device.

In accordance with an aspect of the present disclosure, a wireless communication device may include a receiver to receive a wireless communication; and a processing device configured for communication of paging information in a wireless communication network. The processing device may be configured to control, when a determination is a hotspot device as the wireless communication device and a client device are currently camped on a same cell of a same Radio Access Technology (RAT) type on a same frequency, monitoring and decoding a paging message from a Wireless Wide Area Network (WWAN) addressed to the client device, wherein the monitoring and decoding includes transmitting a request to the client device for decoding information required for the decoding of the paging message and receiving the decoding information from the client device; and entering into a Cellular Paging Decoded and Transmitted over Short Range Wireless Links (SRWL) mode (CPDTOS) with the client device, in which the client device disables paging message decode related processing as long as the client device is connected to and is in the CPDTOS mode with the hotspot device.

In accordance with an aspect of the present disclosure, an apparatus for communication of paging information in a wireless communication network may include: circuitry configured to control, at a client device, when a determination is a hotspot device and the client device are currently camped on a same cell of a same Radio Access Technology (RAT) type on a same frequency, receiving a request from the hotspot device for decoding information required for decoding of a paging message from a Wireless Wide Area Network (WWAN) addressed to the client device; transmitting the decoding information to the hotspot device; and entering into a Cellular Paging Decoded and Transmitted over Short Range Wireless Links (SRWL) mode (CPDTOS) with the hotspot device, and disabling paging message decode related processing as long as the client device is connected to and is in the CPDTOS mode with the hotspot device.

In accordance with an aspect of the present disclosure, a wireless communication device may include a receiver to receive a wireless communication; and a processing device configured for communication of paging information in a wireless communication network. The processing device may be configured to control, when a determination is a hotspot device and a client device as the wireless communication device are currently camped on a same cell of a same Radio Access Technology (RAT) type on a same frequency, receiving a request from the hotspot device for decoding information required for decoding of a paging message from a Wireless Wide Area Network (WWAN) addressed to the client device; transmitting the decoding information to the hotspot device; and entering into a Cellular Paging Decoded and Transmitted over Short Range Wireless Links (SRWL) mode (CPDTOS) with the hotspot device, and disabling paging message decode related processing as long as the client device is connected to and is in the CPDTOS mode with the hotspot device.

DETAILED DESCRIPTION

Figure 1:
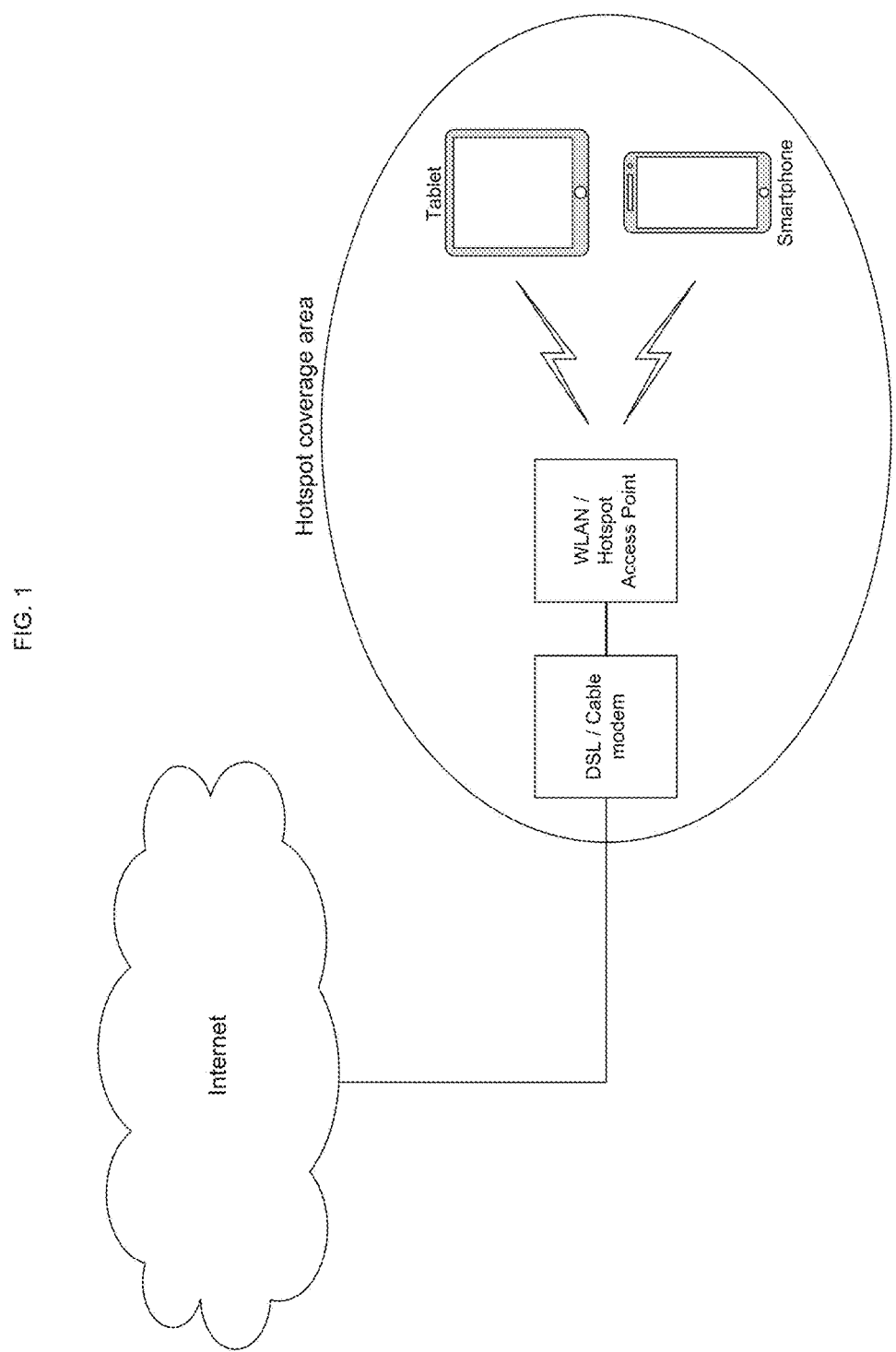
FIG. 1 illustrates an example scenario of internet access using WLAN network over a traditional wire-line internet service.
Figure 2:
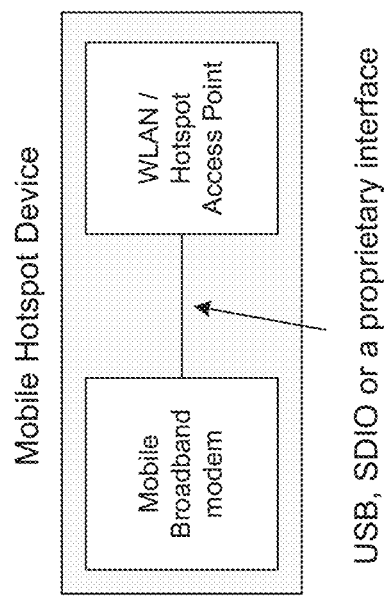
FIG. 2 illustrates a high level block diagram of a mobile Hotspot device.

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

Although aspects of the present disclosure are illustrated using a particular type of mobile Hotspot, the disclosure may be applicable to other types of Hotspots.

Although the aspects of the present disclosure may use the 3GPP LTE as an example for a WWAN used in a mobile Hotspot, the aspects described herein are applicable to other WWAN such as 3GPP Wideband Code Division Multiple Access (WCDMA), High Speed Packet Access (HSPA), Global System for Mobile communication (GSM), General Packet Radio Service (GPRS), Code Division Multiple Access (CDMA), etc. Similarly, although the WLAN may be used as an example SRWL for the mobile Hotspot, other SRWL such as Bluetooth™ may be used by a mobile Hotspot.

The types of client devices connected to a mobile Hotspot may vary. For example, a standard laptop or a desktop Personal Computer (PC), a tablet, etc. may be connected for internet service. Another type device, referred to as machine type device, may be deeply embedded devices inside appliances such as a refrigerator, a washer, a dryer, etc. which may use internet service. This type of devices may have different service requirements such as they may be more delay tolerant than other types of client devices. Another type of device may be a smartphone which may use multiple services such as internet, voice calls, SMS, etc. from the mobile Hotspot. Another type of device may be a cordless phone inside a home or office which may connect to the mobile Hotspot only for voice calls.

The mobile Hotspot and client device may communicate through the SRWL and may exchange their WWAN capabilities such as the RAT type supported by them as disclosed in U.S. patent application Ser. No. 15/233,488 filed Aug. 10, 2016, incorporated by reference herein. For example, the mobile Hotspot and client device may be supporting one or more of the following WWAN: CDMA, GSM, LTE, GPRS, etc.

The mobile Hotspot and the client device communicate with each other the current WWAN identity (i.e., PLMN ID), the RAT type, the CID, the TAI, the frequency of the channel, default DRX cycle or paging cycle, etc. for the cell they are camped on as U.S. patent application Ser. No. 15/233,488 filed Aug. 10, 2016. If there is more than one client device connected to the mobile Hotspot, each client device may communicate to the mobile Hotspot the information about the cell it is camped on.

According to an aspect of the present disclosure, if the mobile Hotspot and a client device are currently camped on to the same cell, namely Cell $C_a$, of the same RAT type, on the same frequency, then the mobile Hotspot may be able to monitor and decode the paging message from the WWAN that is addressed to the client device. At this point, according to an aspect of the present disclosure, the mobile Hotspot may request and the client device may send the information required for decoding its paging message such as client device identity, DRX cycle, and other information that may be necessary for the mobile Hotspot to derive the Paging Occasion and to successfully decode the paging record coming in the paging message from the WWAN. For example, IMSI may be used for the identity, or in case of 3GPP LTE wireless communication system, S-TMSI may be used. After mobile Hotspot receives this information, according to an aspect of the present disclosure, both the mobile Hotspot and client devices may enter into Cellular Paging Decoded and Transmitted over SRWL (CPDTOS) mode in which the client device may disable the paging message decode related processing as long as it is connected to the mobile Hotspot and has entered into CPDTOS mode. According to an aspect of the present disclosure, when there is a change in the camped on cell in either mobile Hotspot or client device, then they may communicate with each other to determine whether they can continue to be in the CPDTOS mode or exit it. According to an aspect of the present disclosure, when there is more than one client device connected to the mobile Hotspot, the same procedure is followed for each client device.

Figure 3:
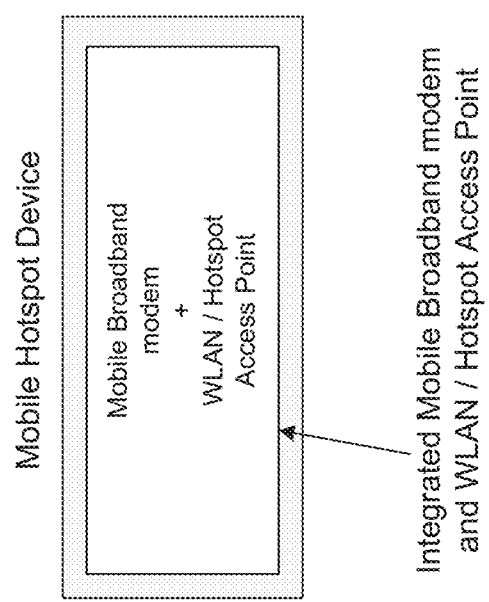
FIG. 3 illustrates a high level block diagram of an example mobile Hotspot device with an integrated mobile broadband modem and WLAN Access Point.
Figure 4:
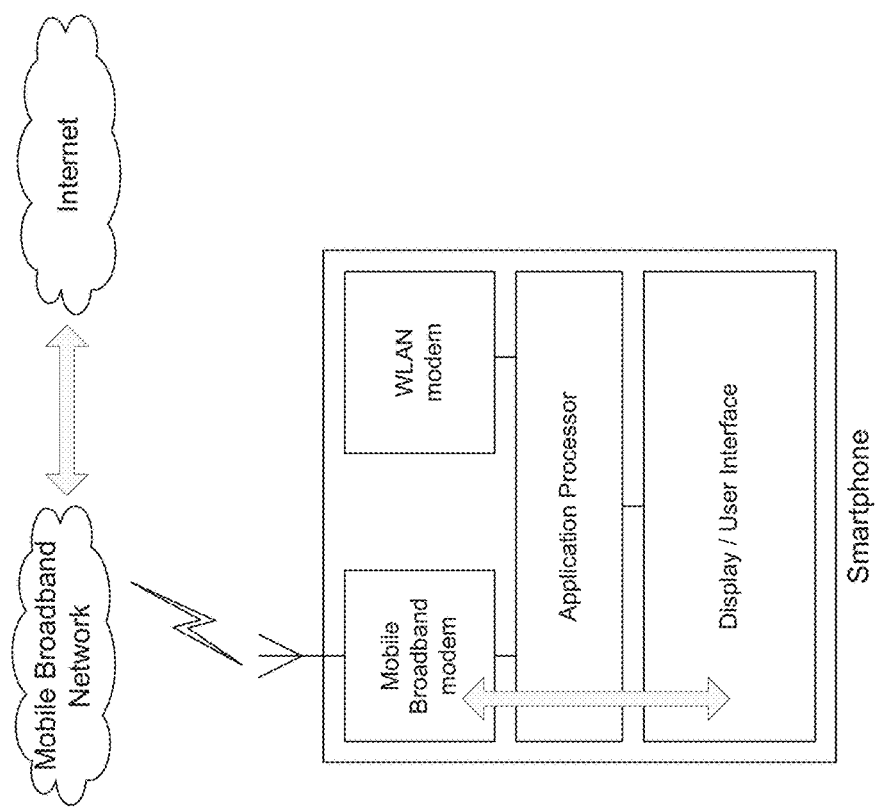
FIG. 4 illustrates a use case of internet access over a mobile broadband network by a smartphone client device.
Figure 5:
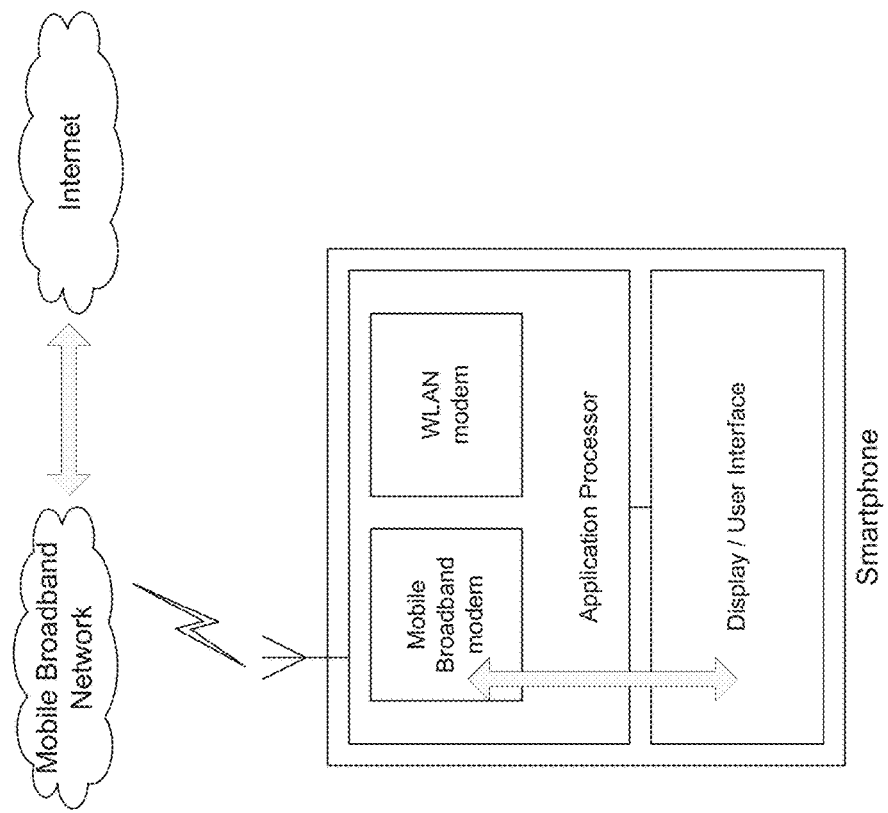
FIG. 5 illustrates a use case of internet access over a mobile broadband network by a smartphone client device with an integrated mobile broadband modem, WLAN Access Point, and Application Processor.
Figure 6:
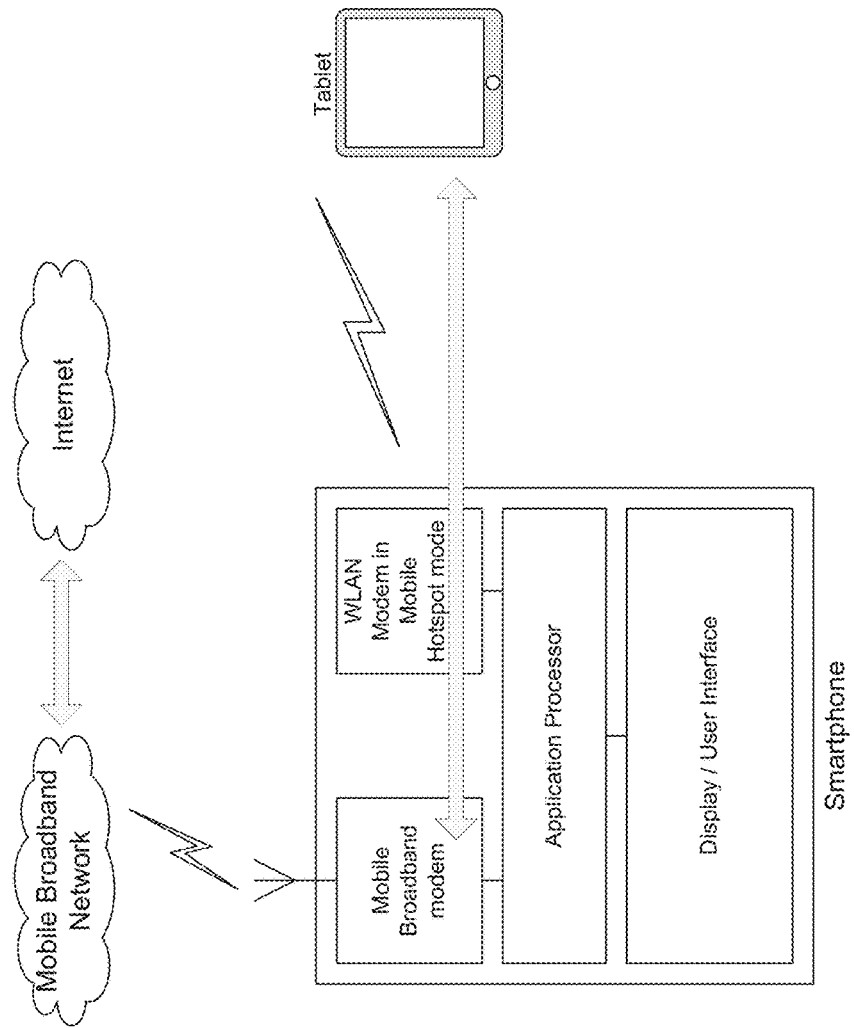
FIG. 6 illustrates a use case of internet access over a WLAN network by a client device through a smartphone operating in mobile Hotspot mode.
Figure 7:
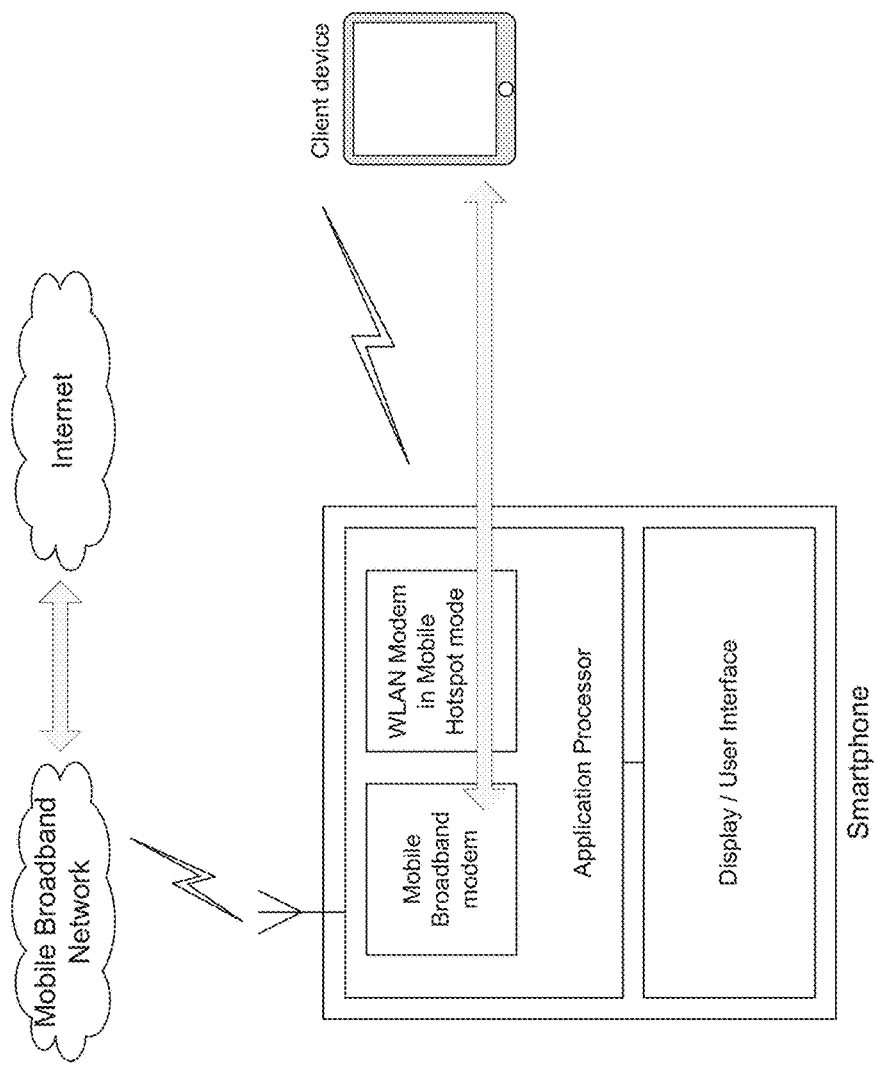
FIG. 7 illustrates a use case of internet access over a WLAN network by a client device through a smartphone operating in mobile Hotspot mode with an integrated mobile broadband modem, WLAN Access Point, and Application Processor.
Figure 8:
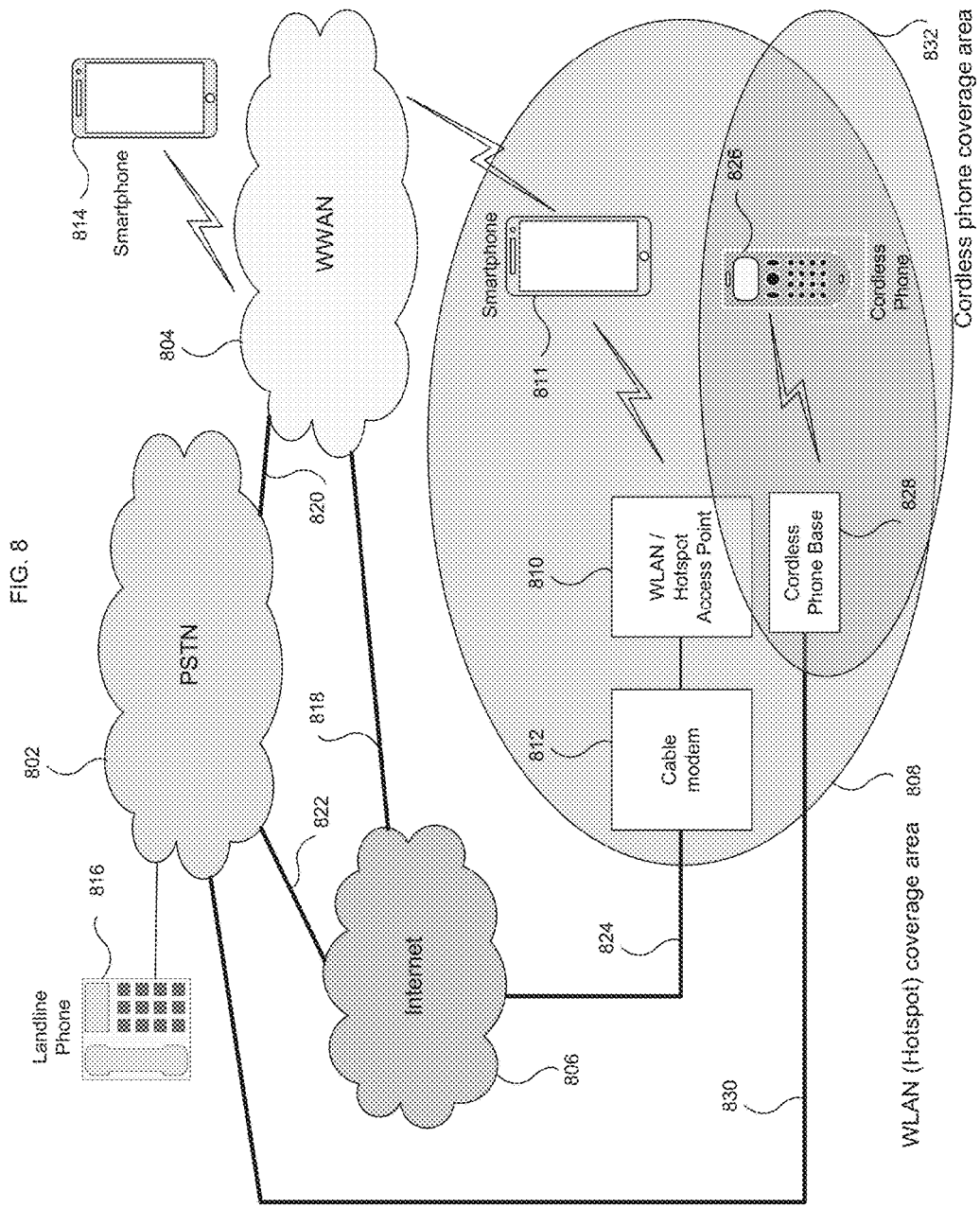
FIG. 8 illustrates a use case of a Smartphone simultaneously connected to different networks for different services.
Figure 9:
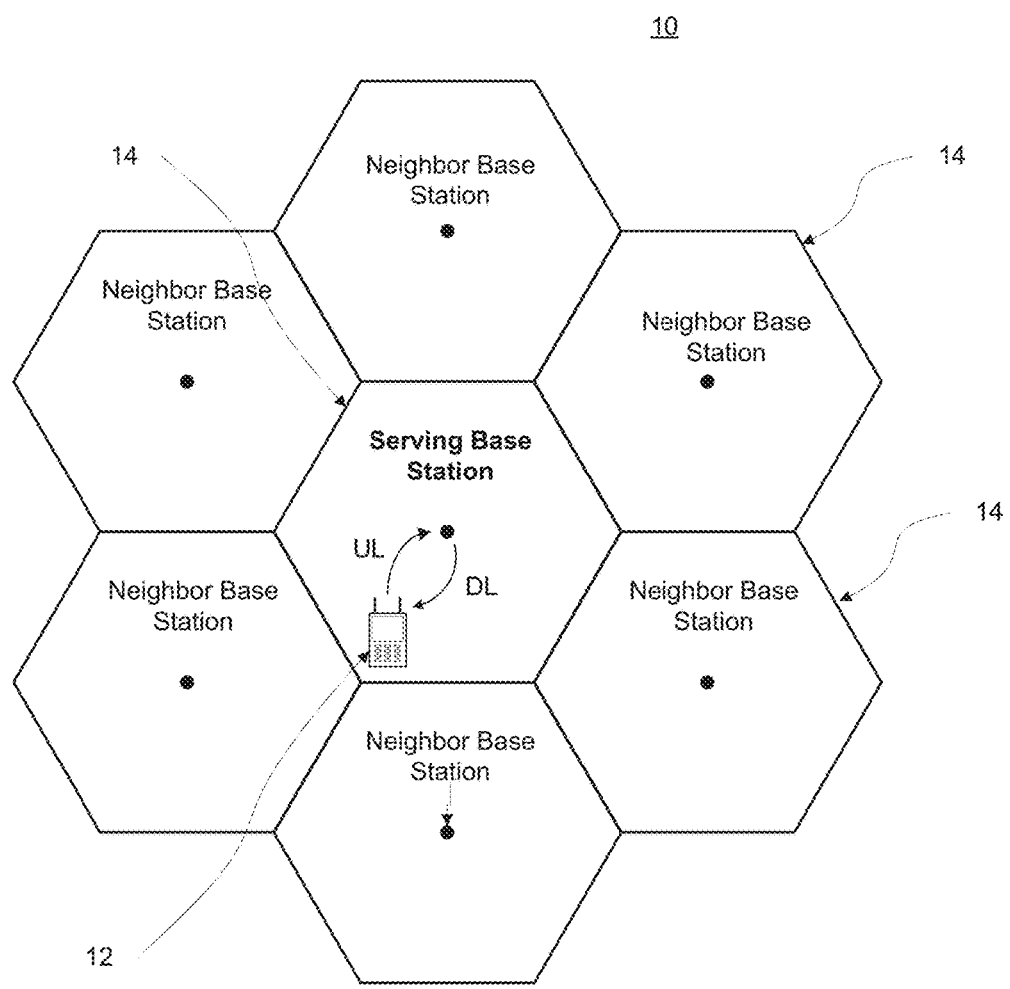
FIG. 9 illustrates a conventional mobile wireless communication system.
Figure 10:
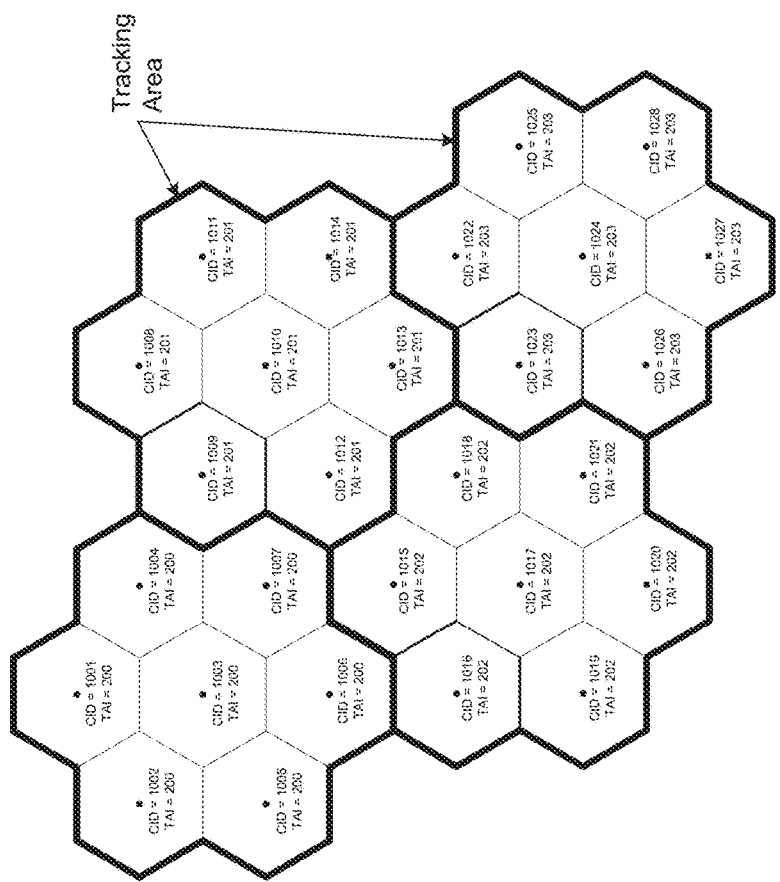
FIG. 10 illustrates the grouping of cells into tracking areas in a wireless communication system.
Figure 11:
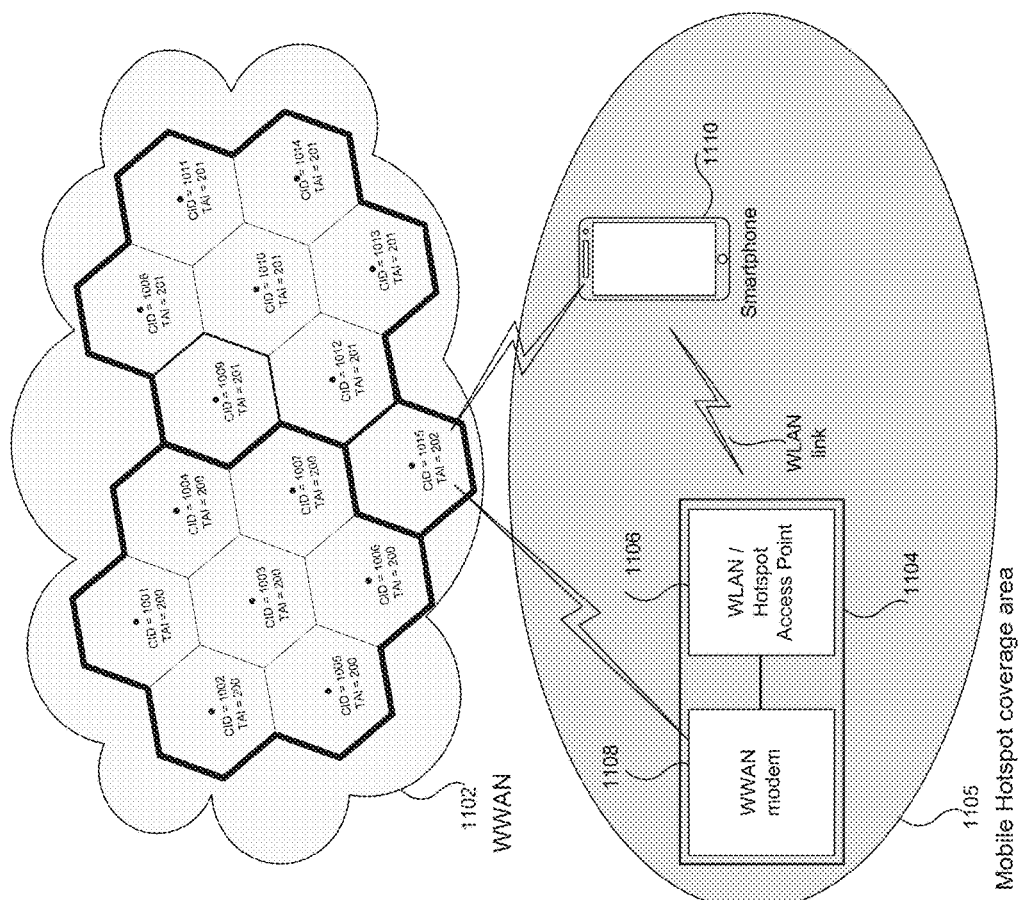
FIG. 11 illustrates an example scenario where the mobile Hotspot and a client device may be camped on the same cell of the same WWAN.
Figure 12:
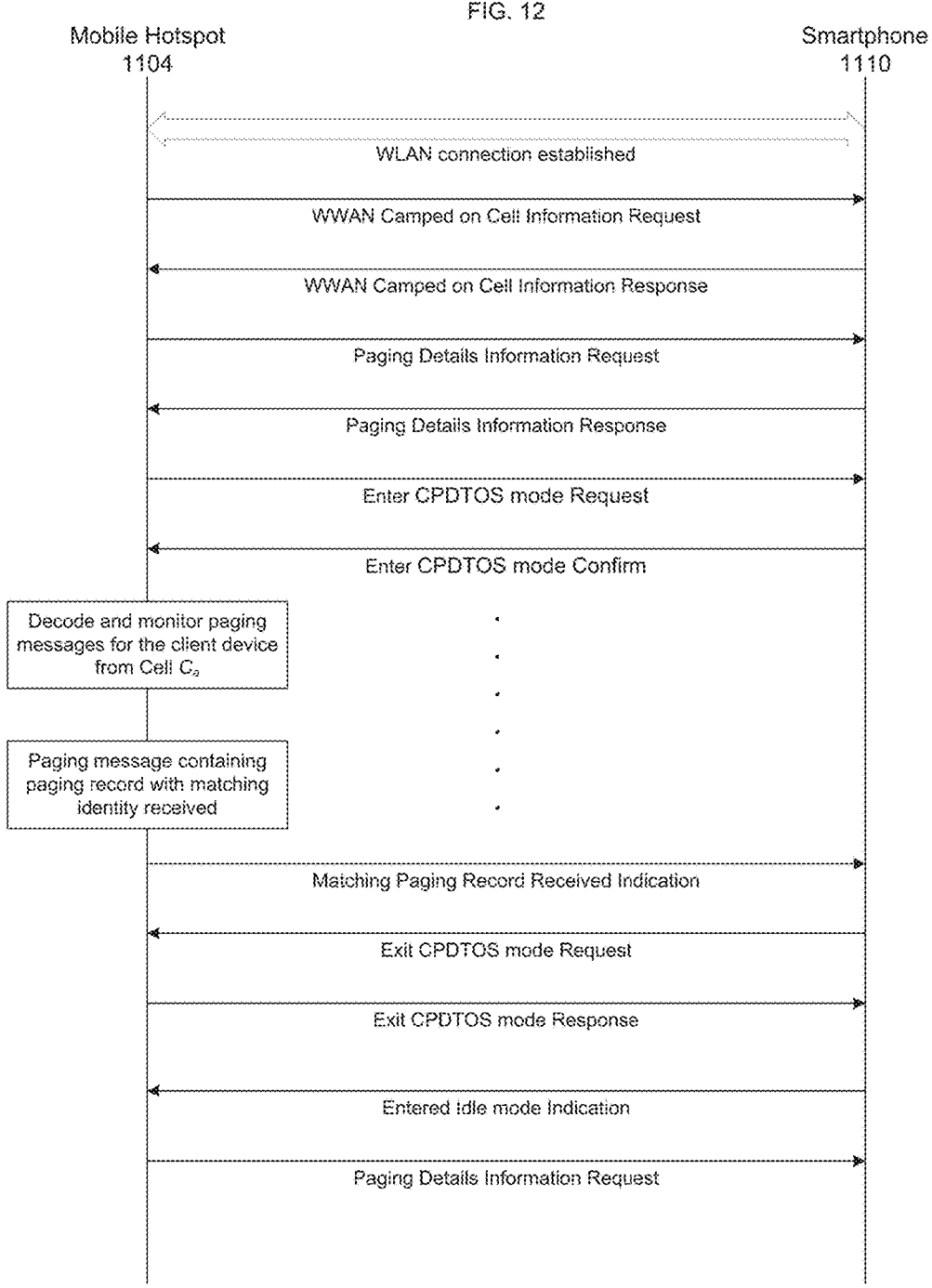
FIG. 12 illustrates a Message Sequence Chart (MSC) for an example scenario for a mobile Hotspot and a client device entering Cellular Paging Decoded and Transmitted over SRWL (CPDTOS) mode according to the aspects of the present disclosure.

FIG. 11 illustrates an example scenario for the application of the present disclosure. As shown in FIG. 11, WWAN coverage 1102 and mobile Hotspot coverage 1105 are illustrated. The mobile Hotspot 1104 comprises the WLAN Access Point (modem) 1106 and WWAN modem 1108. As illustrated in FIG. 3, in another implementation both WLAN modem and WWAN modem may be a single unit. The WWAN modem 1108 is connected to the cell with CID 1015 in the WWAN 1102. The Smartphone 1110 communicates with the mobile Hotspot over the WLAN link for internet services. The Smartphone 1110 also communicates with the cell with CID 1015 for voice calls, SMS, and other services (except internet) provided by the WWAN 1102. The Message Sequence Chart (MSC) for the messages exchanged between the Hotspot 1104 and the Smartphone 1110 over the WLAN link for entering the CPDTOS mode according to the aspects of the present disclosure is illustrated in FIG. 12. The two entities mobile Hotspot 1104 and the Smartphone 1110 involved in the message exchanges are illustrated at the top. Initially, the WLAN link between the two entities may be established. Next the mobile Hotspot 1104 may send the "WWAN Camped-on Cell Information Request" message to the Smartphone 1110 which in return may send the "WWAN Camped on Cell Information Response" message which may include the CID, TAI, frequency, the RAT type, and the PLMN ID of the cell on which the Smartphone 1110 is camped. Upon receipt of this information, the mobile Hotspot 1104 may compare it with the corresponding information about the cell it is camped on. In the present example, as illustrated in FIG. 11, both the mobile Hotspot 1104 and the Smartphone 1110 are camped on the same cell, namely Cell $C_a$ with CID=1015. Therefore, the mobile Hotspot 1104 may conclude that it may be possible to enter the CPDTOS mode. Next the mobile Hotspot 1104 may send the "Paging Details Information Request" message to the Smartphone 1110 which in return may send the "Paging Details Information Response" message which may include the DRX cycle, IMSI, S-TMSI, etc. for the cell on which the Smartphone 1110 is camped on. Upon receipt of this information, the mobile Hotspot 1104 may compare it with the corresponding information about the cell it is camped on and its own WWAN modem parameters such as DRX cycle. Based on the available information, the mobile Hotspot 1104 may conclude that it is possible to enter the CPDTOS mode and may send a message "Enter CPDTOS mode Request" message to the Smartphone 1110 which in turn may accept the request and send the "Enter CPDTOS mode Confirm" message to the mobile Hotspot 1104. At this point, the mobile Hotspot 1104 may start monitoring the PO determined according to the information received in the Paging Details Information Response and decode the paging messages, and in the decoded paging message look for paging records matching with the identity of client devices that have entered the CPDTOS mode. If there is no match, the mobile Hotspot 1104 may take no further action. If there is a paging record with matching identity, the mobile hotspot 1104 may send a "Matching Paging Record Received Indication" message to the Smartphone 1110 which may analyze the received paging record and take further action as per the contents of the received paging record. For example, the paging record may indicate an incoming voice call. In such as case, the client device may determine to initiate the procedures required for establishing a connection with the respective WWAN. As the client device may exit its idle mode of operation, it may determine to exit the CPDTOS with the mobile Hotspot 1104 and send the "Exit CPDTOS mode Request" message. Upon reception of this message, the mobile Hotspot may send the "Exit CPDTOS mode Response" message to the Smartphone 1110 and may stop monitoring and decoding the PO corresponding to the client device. According to an aspect of the present disclosure, when the Smartphone 1110 reenters idle mode, the Smartphone 1110 may send "Entered Idle mode Indication" message to the Hotspot. According to an aspect of the present disclosure when the mobile Hotspot 1104 receives the "Entered Idle mode Indication" from Smartphone 1110 the mobile Hotspot 1104 may send "Paging Details Information Request" to obtain the updated information from Smartphone 1110 and which in return may send the "Paging Details Information Response" message which may include the DRX cycle, IMSI, S-TMSI, etc. for the cell on which the Smartphone 1110 is newly camped on. Upon receipt of this information, the mobile Hotspot 1104 may compare it with the corresponding information about the cell it is camped on and its own WWAN modem parameters such as DRX cycle. Based on the available information, the mobile Hotspot 1104 may conclude that it is possible to enter the CPDTOS mode and may send a message "Enter CPDTOS mode Request" message to the Smartphone 1110 which in turn may accept the request and send the "Enter CPDTOS mode Confirm" message to the mobile Hotspot 1104. At this point, the mobile Hotspot 1104 may start monitoring the PO determined according to the information received in the Paging Details Information Response and may decode the paging messages.

According to an aspect of the present disclosure, multiple client devices may be connected to the mobile Hotspot over the SRWL and the mobile Hotspot may be able to enter the CPDTOS mode with more than one client device concurrently. According to an aspect of the present disclosure, the mobile Hotspot may receive the "Paging Details Information Response" message from multiple client devices. According to an aspect of the present disclosure, after receiving the "Paging Details Information Response" messages, the mobile Hotspot may derive the PO time instances for all the client devices that sent the response. According to an aspect of the present disclosure, if the derived PO time instances are not overlapping with each other or with other scheduled downlink processing for WWAN at mobile Hotspot, then the mobile Hotspot may send the "Enter CPDTOS mode Request" message to all the client devices to enter the CPDTOS mode. According to an aspect of the present disclosure for the client devices camped on to the same cell, namely Cell $C_a$, of the same RAT type, on the same frequency, if one or more of the derived PO time instances are overlapping with other PO time instances at mobile Hotspot, then the mobile Hotspot may use single PO time instance to decode more than one client device paging message and may send a "Enter CPDTOS mode Request" message to the client devices that have overlapping PO time instances as well along with sending the "Enter CPDTOS mode Request" messages only to the client devices that do not have overlapping PO time instances.

Figure 13:
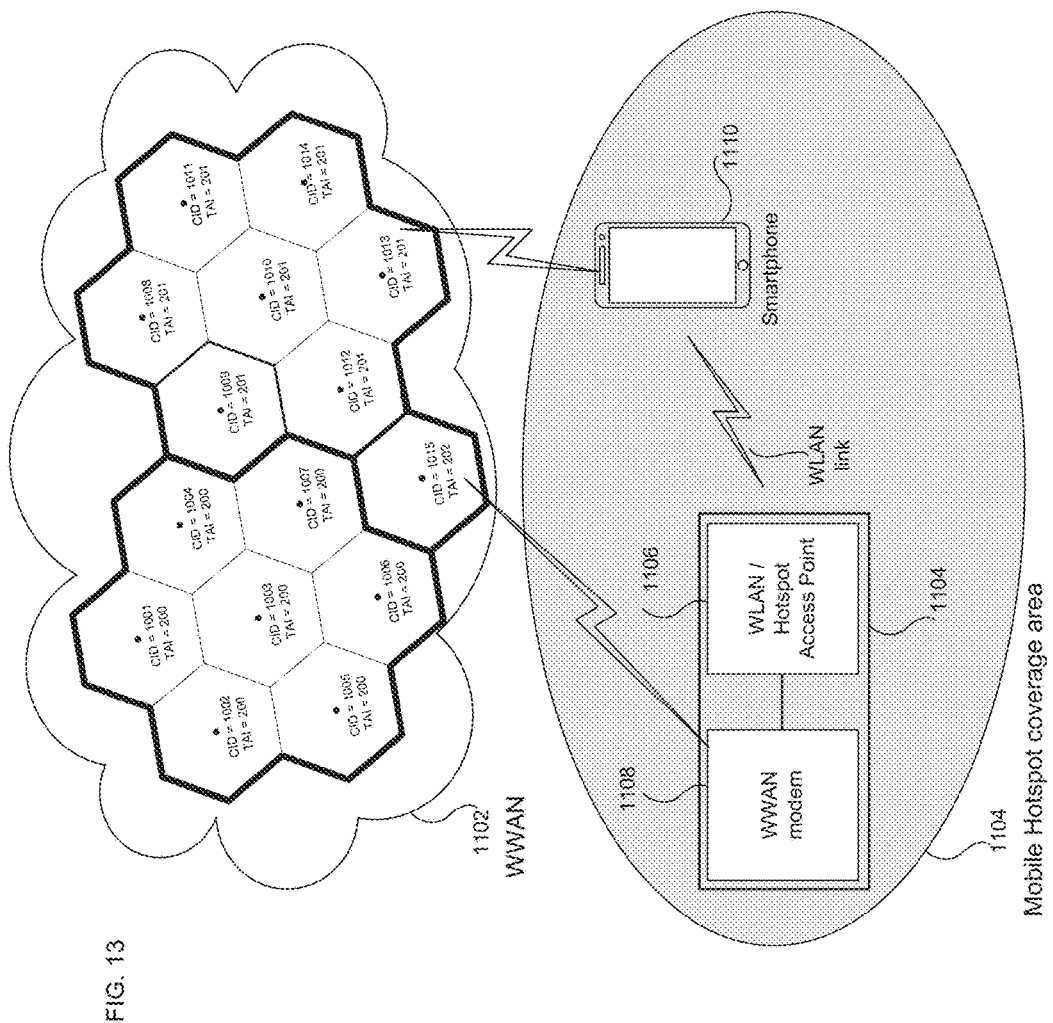
FIG. 13 illustrates an example scenario where the mobile Hotspot and a client device may be camped on different cells of the same WWAN.

According to an aspect of the present disclosure, if the mobile Hotspot and one or more client devices are currently camped on to the cells of the same RAT type, on the same frequency but on different cells, namely $C_a$ and $C_b$ respectively, then the mobile Hotspot may first determine whether it can decode the paging messages from Cell $C_b$. According to an aspect of the present disclosure, if the mobile Hotspot determines that it cannot decode the paging messages from Cell $C_b$ then it may not initiate entry into CPDTOS mode for the client device camped on Cell $C_b$. In general, if the mobile Hotspot determines that it cannot decode the paging messages from cells on which the client devices are camped, then it may not initiate entry into CPDTOS mode for the client devices which are camped on cells different from that of the mobile Hotspot. Note that a subset of the client devices that may be camped on the same cell as the mobile Hotspot may continue to remain in or may enter the CPDTOS mode. According to an aspect of the present disclosure, if the mobile Hotspot determines that it can decode the paging messages from Cell $C_b$ then the mobile Hotspot may initiate entry into CPDTOS mode for the client devices camped on Cell $C_b$ by sending "Enter CPDTOS mode Request" to the client devices and the client devices may send the "Enter CPDTOS mode Confirm" message to the Hotspot. Once the Hotspot receives the "Enter CPDTOS mode Confirm" message from the client devices the Hotspot may decode the paging messages in the respective PO time instances and may look for paging records matching with the client device's identity in the decoded paging message. If there is no match, the mobile Hotspot 1104 may take no further action. If there is a paging record with matching identity, the mobile hotspot 1104 may send a "Matching Paging Record Received Indication" message to the Smartphone 1110. The Smartphone 1110 may analyze the received paging record and take further action as per the contents of the received paging record. For example, the paging record may indicate an incoming voice call. In such case, the client device may determine to initiate the procedures required for establishing a connection with the respective WWAN. As the client device may exit its idle mode of operation, it may determine to exit the CPDTOS with the mobile Hotspot 1104 and send the "Exit CPDTOS mode Request" message. Upon reception of this message, the mobile Hotspot may send the "Exit CPDTOS mode Response" message to the Smartphone 1110 and may stop monitoring and decoding the PO corresponding to the client device. Subsequently, when the Smartphone 1110 reenters idle mode, it may enter CPDTOS mode with the mobile Hotspot 1104. Note that CPDTOS mode may be determined on a per cell and per client device basis. According to an aspect of the present disclosure, the client devices may disable the monitoring and decoding the PO as long as they are connected to the mobile Hotspot and have entered the CPDTOS mode. According to an aspect of the present disclosure, when there is a cell reselection in either mobile Hotspot or one or more of the client devices then they may communicate with each other to determine whether they can continue to be in the CPDTOS mode or exit the CPDTOS mode. FIG. 13 illustrates an example scenario for the application of present disclosure where the mobile Hotspot 1104 is camped on the Cell $C_a$ with CID 1015 and the Smartphone 1110 is camped on Cell $C_b$ with CID 1013.

Figure 14:
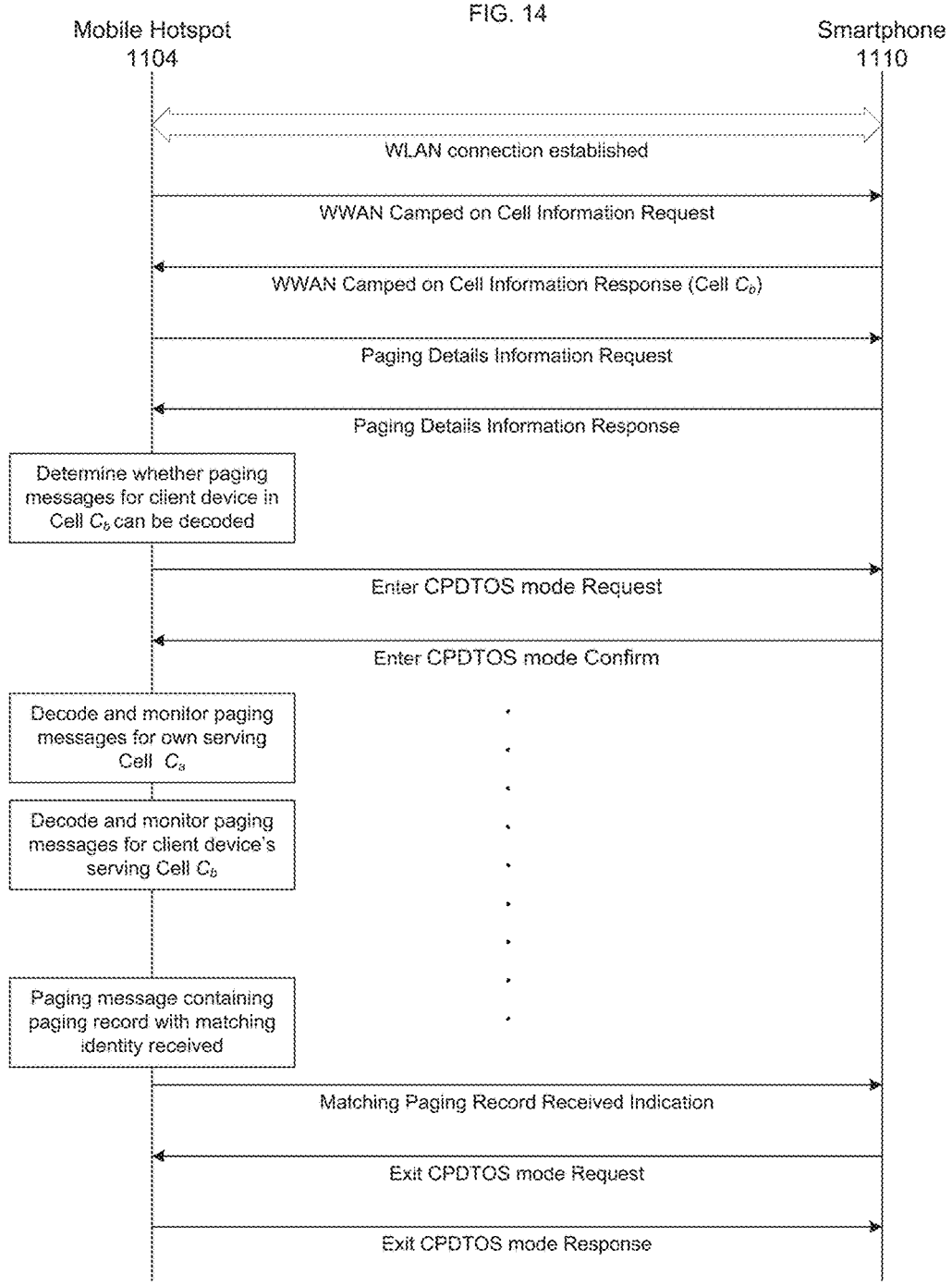
FIG. 14 illustrates an MSC for an example scenario for a mobile Hotspot and a client device entering CPDTOS mode when they are camped on different cells according to the aspects of the present disclosure.

The MSC for the messages exchanged between the mobile Hotspot 1104 and the Smartphone 1110 over the WLAN link for entering the CPDTOS mode when they are camped on different cells of the same frequency, RAT type, and PLMN according to the aspects of the present disclosure are illustrated in FIG. 14. The message exchanges are similar to the case illustrated in FIG. 12 for the case when both the mobile Hotspot and the Smartphone are camped on the same cell. The key difference is that the mobile Hotspot 1104 first determines whether it can decode the paging information from Cell $C_b$ or not and if it can do so then according to an aspect of the present disclosure the mobile Hotspot may decode a paging message from Cell $C_b$ to decide and confirm that it could actually decode the paging message. According to an aspect of the present disclosure only after the mobile Hotspot 1104 has successfully decoded a paging message from the Cell $C_b$, the mobile Hotspot 1104 may send the "Enter CPDTOS mode Request" message to the Smartphone 1110. According to an aspect of the present disclosure if the mobile Hotspot has known priori information about the Cell $C_b$ and if the mobile Hotspot knows that it can decode the paging message in Cell $C_b$ then without waiting to decode any paging message the mobile Hotspot 1104 may send the "Enter CPDTOS mode Request" message to the Smartphone 1110. Subsequently, after having entered the CPDTOS mode, the mobile Hotspot 1104 may continue to monitor the PO time instances of the client device in Cell $C_b$. The mobile Hotspot may decode the paging messages in the respective PO time instances and in the decoded paging message look for paging records matching with the client device's identity. If there is no match, the mobile Hotspot 1104 may take no further action. If there is a paging record with matching identity, the mobile Hotspot 1104 may send a "Matching Paging Record Received Indication" message. The Smartphone 1110 may analyze the received paging record and take further action as per the contents of the received paging record. For example, the paging record may indicate an incoming voice call. In such case, the client device may determine to initiate the procedures required for establishing a connection with the respective WWAN. As the client device may exit its idle mode of operation, it may determine to exit the CPDTOS with the mobile Hotspot 1104 and send the "Exit CPDTOS mode Request" message. Upon reception of this message, the mobile Hotspot 1104 may send the "Exit CPDTOS mode Response" message to the Smartphone 1110 and may stop monitoring and decoding the PO corresponding to the client device. Subsequently, when the Smartphone 1110 reenters idle mode, it may enter CPDTOS mode with the mobile Hotspot 1104.

According to an aspect of the present disclosure, if the mobile Hotspot and one or more client devices are currently camped on to the cells of the same RAT type but different frequencies, namely cells $C_{f1}$ and $C_{f2}$ respectively, then mobile Hotspot may first determine whether it can decode the paging messages from the Cell $C_{f2}$ which may require the mobile Hotspot to tune to frequency f2 of the Cell $C_{f2}$ on which the client device camped on while monitoring its own serving cell frequency f1. According to an aspect of the present disclosure, if the mobile Hotspot determines that it cannot decode the paging messages from Cell $C_{f2}$ then it may not initiate entry into CPDTOS for the client device camped on Cell $C_{f2}$. In general, if the mobile Hotspot determines that it cannot decode the paging messages from cells of different frequencies on which the client devices are camped, then it may not initiate entry into CPDTOS mode for the client devices which are camped on cells using different frequencies from that of the mobile Hotspot. Note that a subset of the client devices that may be camped on the same cell as the mobile Hotspot and client devices that may be camped on different cells but with the same frequency as the mobile Hotspot may continue to remain in the CPDTOS mode. According to an aspect of the present disclosure, if the mobile Hotspot determines that it can decode the paging messages from Cell $C_{f2}$ then the mobile Hotspot and client devices may enter the CPDTOS mode and the mobile Hotspot may monitor the POs and decode the paging messages from the Cell $C_{f2}$. The mobile Hotspot may decode the paging messages in the respective PO time instances and in the decoded paging message look for paging records matching with the client device's identity. If there is no match, the mobile Hotspot 1104 may take no further action. If there is a paging record with matching identity, the mobile hotspot 1104 may send a "Matching Paging Record Received Indication" message to the Smartphone 1110. The Smartphone 1110 may analyze the received paging record and take further action as per the contents of the received paging record. For example, the paging record may indicate an incoming voice call. In such as case, the client device may determine to initiate the procedures required for establishing a connection with the respective WWAN. As the client device may exit its idle mode of operation, it may determine to exit the CPDTOS with the mobile Hotspot 1104 and send the "Exit CPDTOS mode Request" message. Upon reception of this message, the mobile Hotspot 1104 may send the "Exit CPDTOS mode Response" message to the Smartphone 1110 and may stop monitoring and decoding the PO corresponding to the client device. Subsequently, when the Smartphone 1110 reenters idle mode, it may enter CPDTOS mode with the mobile Hotspot 1104. Note that CPDTOS mode may be determined on per cell and per client device basis. According to an aspect of the present disclosure, the client devices may disable the paging message decoding as long as they are connected to the mobile Hotspot and have entered the CPDTOS mode. According to an aspect of the present disclosure, when there is a cell reselection in either mobile Hotspot or one or more of the client devices then they may communicate with each other to determine whether they can continue to be in the CPDTOS mode or exit the CPDTOS mode.

According to an aspect of the present disclosure, if the mobile Hotspot and one or more client devices are currently camped on to the cells of different RAT type, namely cells $C_{RAT1}$ and $C_{RAT2}$ respectively, then mobile Hotspot may first determine whether it supports the RAT2 used by the client devices and whether it supports the particular frequencies used by the RAT2, and whether it can decode the paging messages from the Cell $C_{RAT2}$ which may require the mobile Hotspot to tune to the frequency of the Cell $C_{RAT2}$ camped on by one or more client devices while monitoring its own serving Cell $C_{RAT1}$ of RAT type RAT1. According to an aspect of the present disclosure, if the mobile Hotspot determines that it cannot decode the paging messages for client devices from Cell $C_{RAT2}$ then it may not initiate the CPDTOS mode for those client devices which are camped on cells using different RAT type RAT2 from that of the mobile Hotspot. Note that a subset of the client devices that may be camped on the same cell as the mobile Hotspot and client devices that may be camped on different cells with the same and/or different frequency but the same RAT type as the mobile Hotspot may continue to remain in or enter the CPDTOS mode. According to an aspect of the present disclosure, if the mobile Hotspot determines that it can decode the paging messages for the client devices from Cell $C_{RAT2}$ then the mobile Hotspot and client devices may enter the CPDTOS mode and the mobile Hotspot may decode the paging messages in the respective PO time instances and in the decoded paging message look for paging records matching with the client device's identity. If there is no match, the mobile Hotspot 1104 may take no further action. If there is a paging record with matching identity, the mobile hotspot 1104 may send a "Matching Paging Record Received Indication" message to the Smartphone 1110. The Smartphone 1110 may analyze the received paging record and take further action as per the contents of the received paging record. For example, the paging record may indicate an incoming voice call. In such case, the client device may determine to initiate the procedures required for establishing a connection with the respective WWAN. As the client device may exit its idle mode of operation, it may determine to exit the CPDTOS with the mobile Hotspot 1104 and send the "Exit CPDTOS mode Request" message. Upon reception of this message, the mobile Hotspot may send the "Exit CPDTOS mode Response" message to the Smartphone 1110 and may stop monitoring and decoding the PO corresponding to the client device. Subsequently, when the Smartphone 1110 reenters idle mode, it may enter CPDTOS mode with the mobile Hotspot 1104. Note that CPDTOS mode may be determined on per cell and per client device basis. According to an aspect of the present disclosure, the client devices may disable paging message decoding related processing as long as they are connected to the mobile Hotspot and have entered the CPDTOS mode. According to an aspect of the present disclosure, when there is a cell reselection in either mobile Hotspot or one or more of the client devices then they may communicate with each other to determine whether they can continue to be in the CPDTOS mode or exit the CPDTOS mode.

According to an aspect of the present disclosure, for the cases where the mobile Hotspot agrees with the client devices on monitoring and decoding paging messages for the client devices camped on the same cells or different cells that may be on different frequencies or different RAT types, the mobile Hotspot may monitor POs in the downlink for all the agreed upon cells of different frequencies and RAT types. The mobile Hotspot may manage its downlink monitoring schedule accordingly for respective cells.

Note that a change in the DRX cycle typically may change the PO for the client devices in that particular network. According to an aspect of the present disclosure, if the mobile Hotspot finds an overlap in the POs of different cells in the same or different frequencies and RAT types, then it may request the affected one or more client devices to change their DRX cycle through the "Paging Details Information Request" message to determine whether the change in DRX cycle could change the POs such that the POs overlap may be avoided. The one or more client devices may change their DRX cycle and inform the mobile Hotspot using the "Paging Details Information Response" message. According to an aspect of the present disclosure, if the mobile Hotspot could not find any non overlapping POs for the client devices camped on cells of the same or different frequencies and RAT types, then the mobile Hotspot may communicate the same to the affected client devices and may not enter CPDTOS mode or exit the CPDTOS mode for those client devices.

According to an aspect of the present disclosure, when the mobile Hotspot attempts to decode paging message for one or more client devices camped on cells of the same or different frequencies and RAT types, it may find an overlap with POs of cells of the same or different frequencies and RAT types to be monitored for client devices with which it has entered in CPDTOS mode. In such a case, one of the four alternative methods as described next may be used.

Figure 15:
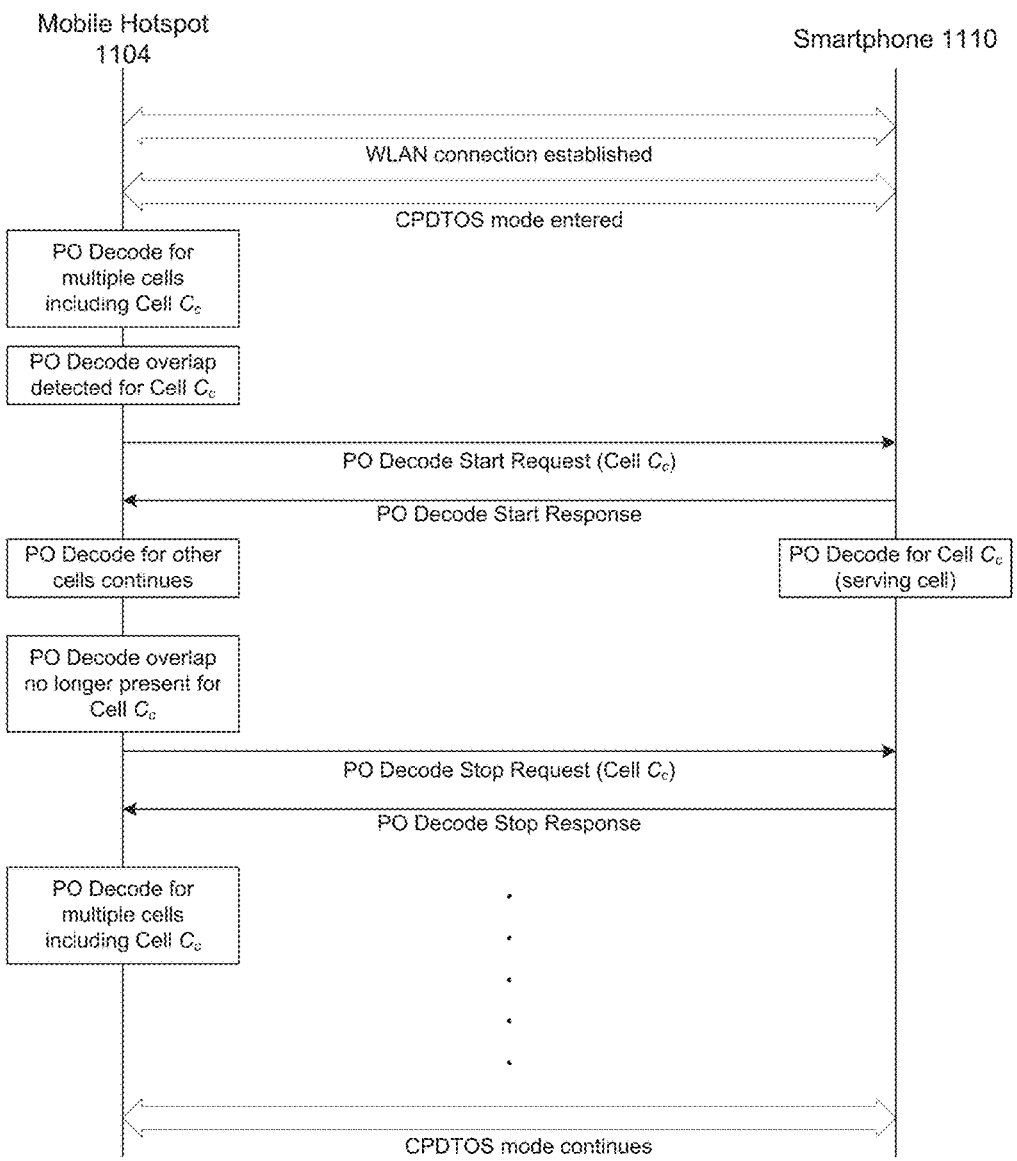
FIG. 15 illustrates an MSC for an example scenario for the handling of Paging Occasion (PO) overlap in a mobile Hotspot followed by a client device performing PO decoding and then eventual removal of PO overlap according to the aspects of the present disclosure.

According to an aspect of the present disclosure, in the first alternative, the mobile Hotspot may first prioritize the cells of the same frequency and RAT type in which the mobile Hotspot is camped on. According to an aspect of the present disclosure, for the cells on other frequencies and RAT types, for which the mobile Hotspot sees an overlap of the POs of certain client devices, the mobile Hotspot may communicate to those client devices that it may not be able to decode the next PO for those client devices and may request the client devices to perform the PO decode by themselves and, according to an aspect of the present disclosure, the mobile Hotspot may continue to be in CPDTOS mode with those client device. This example scenario is illustrated in the MSC contained in FIG. 15. At the beginning, the mobile Hotspot 1104 and the client device Smartphone 1110 have already entered into the CPDTOS mode. At this point, the mobile Hotspot may monitor the PO for all the required cells including the inter-frequency Cell $C_c$ on which the client device Smartphone 1110 may be camped. Subsequently, for the current example scenario, the SI of the serving cell of the mobile Hotspot may change which may lead to PO overlap for the inter-frequency Cell $C_c$. At this time, the mobile Hotspot may send the "PO Decode Start Request" message to the client device Smartphone 1110 which may accept the request and send the "PO Decode Start Response" message to the mobile Hotspot. Subsequently, the mobile Hotspot 1104 and the client device Smartphone 1110 may continue to decode their respective PO's. Subsequently, the SI of the serving cell of the mobile Hotspot may change which may lead to the removal of the PO overlap for the inter-frequency Cell $C_c$. At this time, the mobile Hotspot 1104 may send the "PO Decode Stop Request" message to the client device Smartphone 1110 which may accept the request and send the "PO Decode Stop Response" message to the mobile Hotspot. From this point forward, the mobile Hotspot may continue to monitor the PO for all the required cells and the client device Smartphone 1110 may not monitor its own PO on its Cell $C_c$.

Figure 16:
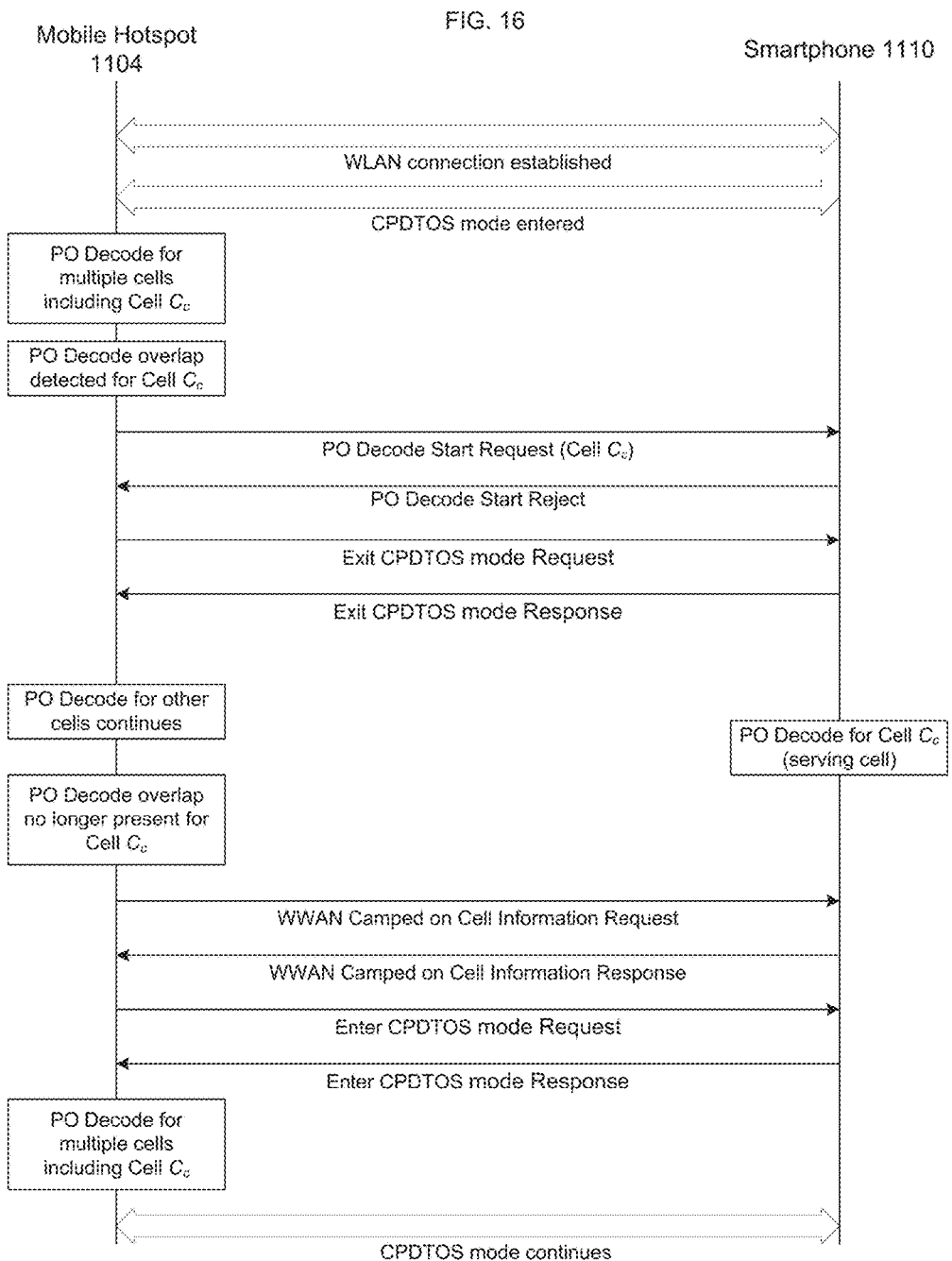
FIG. 16 illustrates an MSC for an example scenario for the handling of PO overlap in a mobile Hotspot followed by a client device rejecting PO decoding and then eventual removal of PO overlap according to the aspects of the present disclosure.

According to an aspect of the present disclosure, if the client device denies the request from the mobile Hotspot for decoding the PO and to continue to be in CPDTOS mode, then the mobile Hotspot may exit the CPDTOS mode with the client device and the client device may perform normal PO decode by itself. According to an aspect of the present disclosure, the mobile Hotspot, after completing its own ongoing SI decode, if it finds the non overlapping POs for one or more of client devices for which it previously exited the CPDTOS mode or could not enter the CPDTOS mode because of the overlap in the PO in the past due to SI decode, the mobile Hotspot may send either "WWAN Camped on Cell Information Request" or "Enter CPDTOS mode request" to one or more of such client devices to request them to enter the CPDTOS mode. This example scenario is illustrated in the MSC contained in FIG. 16. At the beginning, the mobile Hotspot 1104 and the client device Smartphone 1110 have already entered into the CPDTOS mode. At this point, the mobile Hotspot 1104 monitors the PO for all the required cells and client devices including the inter-frequency Cell $C_c$ on which the client device Smartphone 1110 may be camped. Subsequently, the SI of the serving cell of the mobile Hotspot may change which may lead to PO overlap for the inter-frequency Cell $C_c$. At this time, the mobile Hotspot 1104 may send the "PO Decode Start Request" message to the client device Smartphone 1110 which may not accept the request and send the "PO Decode Start Reject" message to the mobile Hotspot. At this time, the mobile Hotspot 1104 may send the "Exit CPDTOS mode Request" message to the client device Smartphone 1110 which may accept the request and send the "Exit CPDTOS mode Response" message to the mobile Hotspot. Subsequently, the mobile Hotspot may continue to decode the POs for remaining required cells and client devices. The client device Smartphone 1110 may take necessary steps, including possibly acquiring updated SI, etc., to resume PO decoding on its own. Subsequently, the SI of the serving cell of the mobile Hotspot may change which may lead to the removal of the PO overlap for the inter-frequency Cell $C_c$. At this time, the mobile Hotspot 1104 may send the "Paging Details Information Request" message to the client device Smartphone 1110 which may accept the request and send the "Paging Details Information Response" message to the mobile Hotspot. The mobile Hotspot 1104 may conclude that it is possible to enter the CPDTOS mode and may send a message "Enter CPDTOS mode Request" message to the client device Smartphone 1110 which in turn may accept the request and send the "Enter CPDTOS mode Confirm" message to the mobile Hotspot. From this point forward, the mobile Hotspot may continue to monitor the PO for all the required cells and client devices while the client device Smartphone 1110 may not monitor its own PO on the Cell $C_c$.

According to an aspect of the present disclosure, in the second alternative, the mobile Hotspot may prioritize the PO decoding of cells of other frequencies and RAT types, since PO decoding may be typically a higher priority and the mobile Hotspot may defer the SI decode for cells on its camped on frequency and RAT type. This may be a preferred alternative as there is usually periodic broadcast of SIs from each cell of the same or different frequencies and RAT types. According to an aspect of the present disclosure, the mobile Hotspot may determine to defer the SI decode if the delayed decoding of SI may not impact the normal operation and performance of the mobile Hotspot.

According to an aspect of the present disclosure, in the third alternative, the client device may give "priority request" based on its current state such as battery level to the mobile Hotspot for PO monitoring. For example, in case of battery operated client devices with low battery level and which needs more power saving may set higher priority for its PO monitoring when compared to the client devices with more battery power or the client devices which may not worry much of power save and which can monitor its own PO. According to an aspect of the present disclosure the mobile Hotspot may take the "priority request" from the client device into consideration to decide which client devices the PO can be monitored and for which other client devices the PO monitoring can be cancelled. According to an aspect of the present disclosure the client device may communicate the "priority request" in the "Paging Details Information Response" message.

According to another aspect of the present disclosure, in the fourth alternative the mobile Hotspot may be preconfigured with the priorities set on client devices and/or the RAT types and/or the frequencies for PO monitoring. When the mobile Hotspot detects the PO overlap then the mobile Hotspot may use the preconfigured priorities to decide which client device PO can be monitored and which client device PO monitoring can be cancelled.

Figure 17:
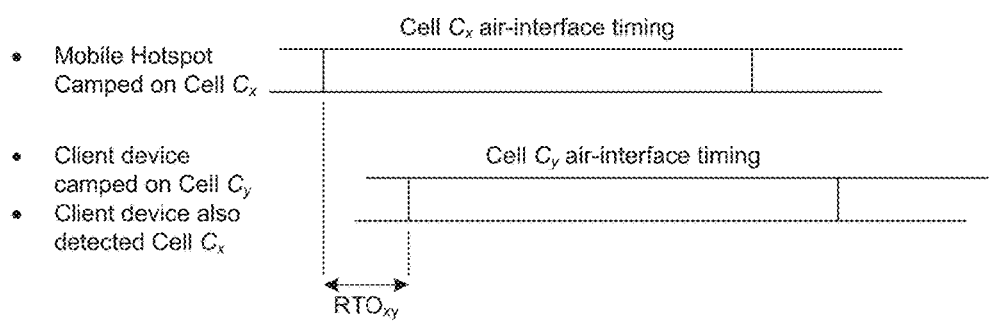
FIG. 17 illustrates the timing of a cell camped on by the mobile Hotspot and a cell camped on by a client device and the Relative Timing Offset (RTO) between the timing of the two cells.

Typically in any client device a relative time offset is maintained for the detected cells with respect to the currently camped on cell. According to an aspect of the present disclosure the mobile Hotspot may share its currently camped on Cell $C_x$ information such as RAT type, frequency, CID to the client device in "WWAN Camped-on Cell Information Request" message. According to an aspect of the present disclosure, if the client device has the relative time offset of its camped on Cell $C_y$ with respect to the mobile Hotspot camped on Cell G then the client device may estimate the relative time offset "$RTO_{xy}$" as illustrated in FIG. 17 and may provide it to the mobile Hotspot in "WWAN Camped-on Cell Information Response" message. According to an aspect the present disclosure the mobile Hotspot may use the relative time offset "$RTO_{xy}$" given by the client device to expedite the timing synchronization with the Cell $C_y$ and thereby may do faster paging message decode in Cell $C_y$.

According to an aspect of the present disclosure, when a mobile Hotspot may be built with multiple (for example, M) receiver/decoder circuits, it may decode in parallel even the overlapping POs and SIs from multiple (for example, N) cells of the same or different frequencies and RAT types. Note that M and N may not necessarily be the same.

According to an aspect of the present disclosure, when a client device goes out of range of the mobile Hotspot then it may exit CPDTOS mode and may start decoding the PO on its own as normal.

According to an aspect of the present disclosure, when a client device disconnects with the mobile Hotspot then it may exit CPDTOS mode and may start decoding the PO on its own as normal.

According to an aspect of the present disclosure, the mobile Hotspot at any point of time may communicate to client devices and may exit CPDTOS mode.

According to an aspect of the present disclosure, if the mobile Hotspot fails to decode the paging message in any PO then it may notify the impacted client devices and may exit CPDTOS mode with the respective client devices.

According to an aspect of the present disclosure when the mobile Hotspot decodes the paging messages in the respective PO time instances and in the decoded paging message if there is no match in the paging record for certain client devices, the mobile Hotspot 1104 may send a "No Matching Paging Record Received Indication" message to the applicable client devices. This may enable the client devices to refresh various counters and timers, such as "keep-alive timer", to continue to maintain its status with the WWAN. It is to be noted that the mobile Hotspot may receive a single paging message in a PO instance and the paging message may carry matching paging records for more than one client device which are in CPDTOS mode with the mobile Hotspot. Also it may be possible that more than one client device may be expected to receive the paging message with matching paging record in a single PO instance, but in a given PO instance the paging message may carry one or more or none of the matching paging records. In such a case, according to the aspect of the present disclosure, the mobile Hotspot may send "Matching Paging Record Received Indication" message to the client devices for which the matching paging record was detected in the paging message and the mobile Hotspot may send "No Matching Paging Record Received Indication" message to the client devices for which the matching paging record was not received in the paging message.

According to an aspect of the present disclosure, the mobile Hotspot may enter CPDTOS mode autonomously and may start broadcasting "Paging Details Information Request" message. The mobile Hotspot may do this whenever a new client device gets connected to it. The mobile Hotspot may also do this whenever there is an update or change in SI in its serving cell and the mobile Hotspot successfully decodes the updated SI. This may enable timely determination of whether CPDTOS mode can be continued or not.

According to an aspect of the present disclosure, the mobile Hotspot may be pre-configured with a set of cells of the same or different frequencies, and RAT type for which it is expected to monitor and/or decode POs from the respective cells.

According to an aspect of the present disclosure, the mobile Hotspot may determine whether to transmit the Matching Paging Record Received Indication using an application which may run in the mobile Hotspot and in the client devices and the applications on the two entities may communicate through a peer to peer protocol on any logical channel of the underlying SRWL being used. According to an aspect of the present disclosure, the peer to peer application may be independent of the particular SRWL being used and it may be achieved through a virtual communication port established in both mobile Hotspot and in the client devices. The SRWL connection may be mapped to the virtual communication port and the applications may communicate using the virtual communication port. For example, in case of WLAN SRWL, it could be a Transmission Control Protocol/Internet Protocol (TCP/IP) socket based communication between the mobile Hotspot and the client devices.

According to an aspect of the present disclosure, the mobile Hotspot and the client devices may create a new physical or logical channel, namely Cellular Paging Message Communication Channel (CPMCC), which may be pre-negotiated and dedicated for the CPDTOS mode information exchange. This CPMCC may be defined with a periodicity and time slot where the mobile Hotspot may broadcast the Matching Paging Record Received Indication and the client devices may monitor the CPMCC on a pre-defined agreed upon periodicity and time slot to receive the paging record from the mobile Hotspot. According to an aspect of the present disclosure the mobile Hotspot and the client device may use the CPMCC for other cellular network information exchange (other than Matching Paging Record Received Indication) between the client device and the mobile Hotspot.

According to an aspect of the present disclosure, when a client device disconnects from the mobile Hotspot and if the client device is not able to find another mobile Hotspot in its current location, then client device may start decoding the POs directly from the WWAN.

A mobile Hotspot may be equipped with more than one source for primary sources of internet. For example, a mobile Hotspot may be equipped with a cable modem and a WWAN modem. According to an aspect of the present disclosure, a mobile Hotspot may be using the cable modem to provide internet service while it may be using the WWAN modem strictly for PO monitoring and decoding purposes, i.e., a mobile Hotspot need not be using the WWAN for providing internet service in order to only monitor the POs from WWAN cells.

A client device operating according to the aspects of the present disclosure may enter power save mode without monitoring and decoding of PO which may lead to reduced power consumption and extended battery life. According to an aspect of the present disclosure, when the client device enters the CPDTOS mode, the client device may turn off the RF receiver of the cellular modem during PO time slot and may enter a power save state. This may be a significant advantage for deeply embedded client devices powered with limited capacity batteries. For the case where the mobile Hotspot and client devices are camped on the same cell of the same frequency and the same RAT type, the mobile Hotspot need not do any additional decoding. This is likely to be the most common case when the mobile Hotspot and client devices have the service from the WWAN with the same PLMN. When a client device first connects with the mobile Hotspot, there is a high probability the client device may camp on to the same cell as the mobile Hotspot for getting service from the WWAN with the same PLMN.

Figure 18:
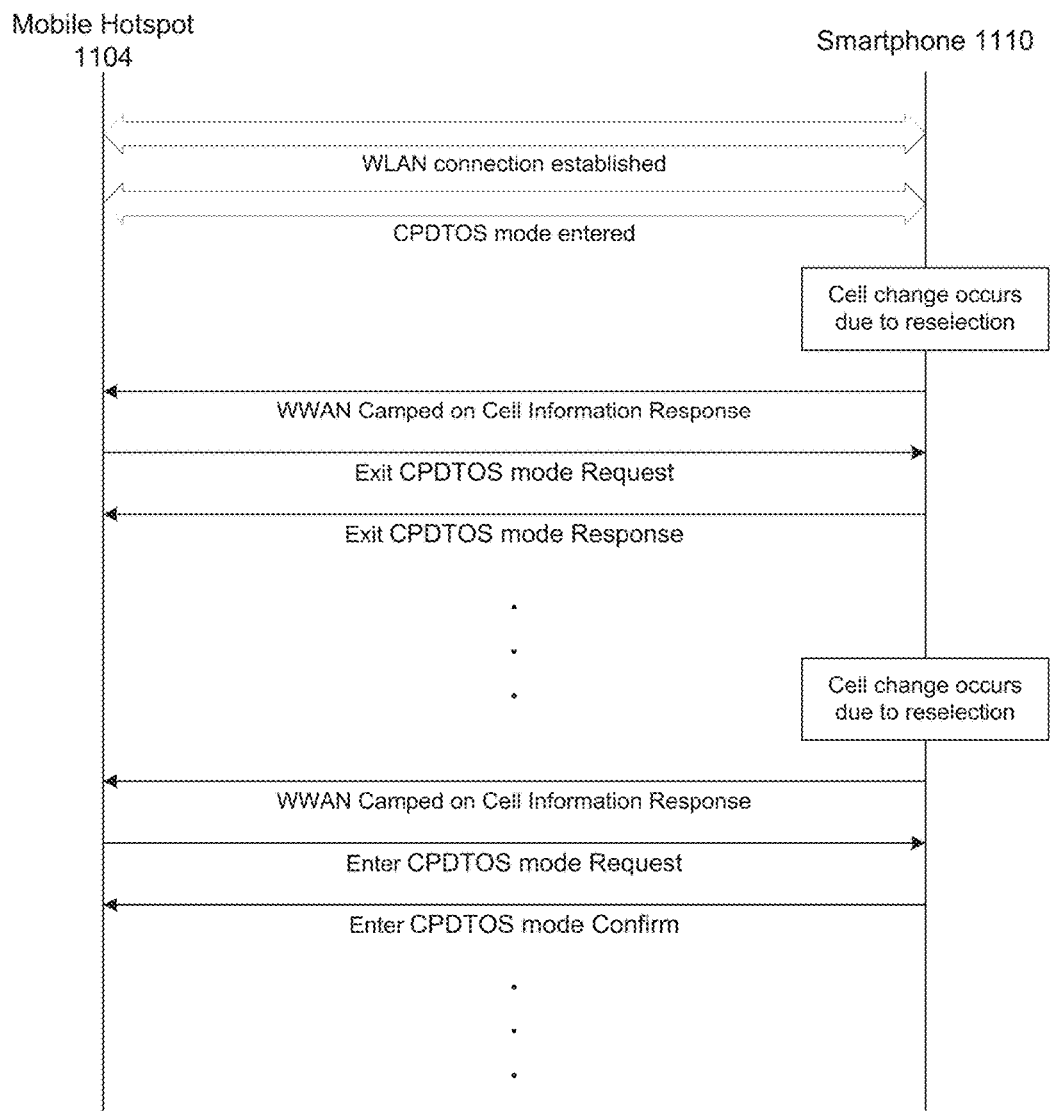
FIG. 18 illustrates an MSC for an example scenario for the handling of cell reselection by a client device leading to the end of CPDTOS mode followed by another reselection leading to entering of CPDTOS mode according to the aspects of the present disclosure.

According to an aspect of the present disclosure, when the mobile Hotspot and the client devices are in CPDTOS mode and if a cell change occurs in either mobile Hotspot or in one or more of the client devices and if the mobile Hotspot may not able to continue the CPDTOS mode with one or more of the client devices then the mobile Hotspot may send "Exit CPDTOS mode Request" to one or more of the client devices and may exit the CPDTOS mode with those client devices. An example of this type of scenario is illustrated in FIG. 18 where initially the mobile Hotspot 1104 and the client device Smartphone 1110 are in CPDTOS mode. At some point the client device Smartphone 1110 may perform cell reselection and to ensure that the CPDTOS mode can be continued, it may send the "WWAN Camped on Cell Information Response" message to the mobile Hotspot to update its serving cell information. The mobile Hotspot 1104 may determine that it may not be able to support the CPDTOS mode for the client device Smartphone 1110 for the newly selected cell. Therefore, the mobile Hotspot 1104 may send the "Exit CPDTOS mode Request" message to the client device Smartphone 1110 which may accept the request and send the "Exit CPDTOS mode Response" message to the mobile Hotspot. At further later point in time, the client device Smartphone 1110 may perform another cell reselection and to ensure that the CPDTOS mode can be entered, it may send the "WWAN Camped on Cell Information Response" message to the mobile Hotspot to update its serving cell information. The mobile Hotspot 1104 may determine that it may be able to support the CPDTOS mode for the client device Smartphone 1110 for the newly selected cell. Therefore, the mobile Hotspot 1104 may send the "Enter CPDTOS mode Request" message to the client device Smartphone 1110 which may accept the request and send the "Enter CPDTOS mode Response" message to the mobile Hotspot. From this point forward, the mobile Hotspot may continue to monitor the POs for the serving cell of the client device Smartphone 1110.

Figure 19:
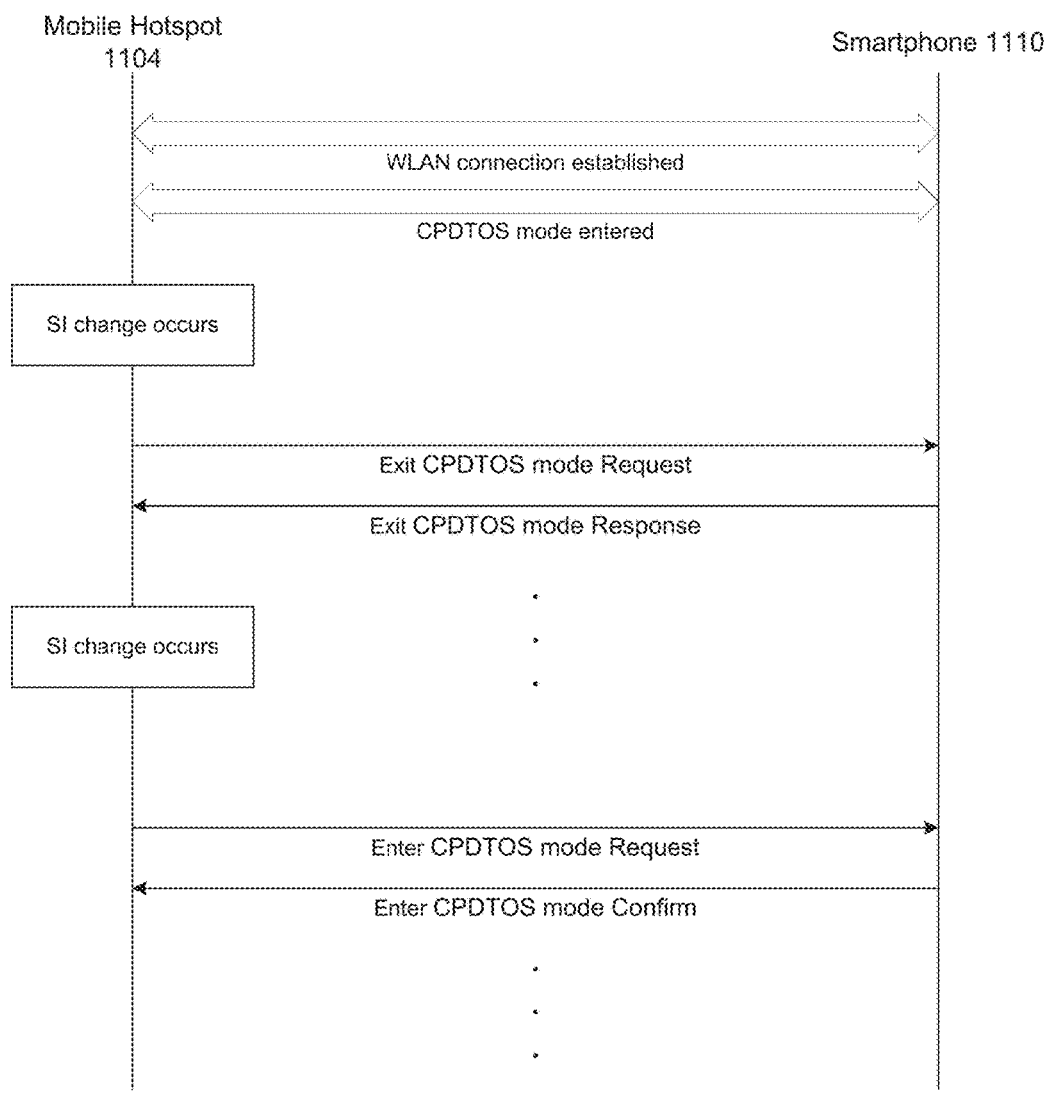
FIG. 19 illustrates an MSC for an example scenario for the handling of Discontinuous Reception (DRX) cycle change by leading to the end of CPDTOS mode followed by DRX cycle change leading to entering to CPDTOS mode according to the aspects of the present disclosure.

The network may update the default DRX cycle or paging cycle as part of SI change and which may change the PO to be monitored for the current serving cell for the mobile Hotspot. Sometimes a user may change the DRX cycle on the mobile Hotspot and which may also lead to change in the PO to be monitored for the current serving cell for the mobile Hotspot. According to an aspect of the present disclosure, when the mobile Hotspot and the client devices are in CPDTOS mode and if there is a change in the PO to be monitored for the mobile Hotspot serving cell, the mobile Hotspot may not be able to continue the CPDTOS mode with one or more of the client devices then the mobile Hotspot may send "Exit CPDTOS mode Request" to one or more of the client devices and may exit the CPDTOS mode with those client devices. An example of MSC for handling this type of scenario is illustrated in FIG. 19 where initially the mobile Hotspot 1104 and the client device Smartphone 1110 are in CPDTOS mode. At some point the SI of the camped on cell of the client device Smartphone 1110 may be updated by the WWAN. The mobile Hotspot 1104 may determine that it may not be able to support the CPDTOS mode for the client device Smartphone 1110 for the updated DRX cycle in the new SI. Therefore, the mobile Hotspot 1104 may send the "Exit CPDTOS mode Request" message to the client device Smartphone 1110 which may accept the request and send the "Exit CPDTOS mode Response" message to the mobile Hotspot. At further later point in time, the SI of the camped on cell of the client device Smartphone 1110 may be updated by the network and the mobile Hotspot may send the "WWAN Camped on Cell Information Response" message to the mobile Hotspot to update its serving cell information. The mobile Hotspot 1104 may determine that it may be able to support the CPDTOS mode for the client device Smartphone 1110 for the updated DRX cycle in the newly updated SI. Therefore, the mobile Hotspot 1104 may send the "Enter CPDTOS mode Request" message to the client device Smartphone 1110 which may accept the request and send the "Enter CPDTOS mode Response" message to the mobile Hotspot. From this point forward, the mobile Hotspot may continue to monitor the PO and the SI for the serving cell of the client device Smartphone 1110.

As part of the SI update, the default DRX cycle or paging cycle may change for the cells of the same or different frequencies and/or RAT types that are monitored for the client devices. According to an aspect of the present disclosure, if a client device detects a change in the default DRX cycle or paging cycle which may change the default PO to be monitored in its current serving cell then the client device may communicate the changed default DRX cycle or paging cycle to the mobile Hotspot. According to an aspect of the present disclosure, when there is a change in the PO for the client device's serving cell and the mobile Hotspot may not be able to continue to monitor the new PO because of overlap in PO and in such a case the mobile Hotspot may send "Exit CPDTOS mode Request" to one or more of the client devices and may exit the CPDTOS mode with those client devices.

According to an aspect of the present disclosure, a mobile Hotspot may perform SI monitoring and updating as described in U.S. Ser. No. 15/233,488 filed Aug. 10, 2016, in combination with PO monitoring and decoding as per the aspects of the present disclosure. According to an aspect of the present disclosure, the redundant steps performed as described in U.S. Ser. No. 15/233,488 filed Aug. 10, 2016, and the present disclosure may be eliminated. For example, in U.S. Ser. No. 15/233,488 filed Aug. 10, 2016, the PO monitoring and decoding is done only for the purpose of detecting any update in SI of all the monitored cells. The PO is not determined according to a particular client device's identity. Rather, the PO instances are selected to avoid any collision of paging decoding with SI or any other decoding. In the present application, the PO monitoring and decoding is done to check for any incoming paging message for specific client devices. Therefore, the step of PO monitoring for detecting change in SI may be combined with the step of PO decoding for receiving paging messages for client devices.

According to an aspect of the present disclosure, a mobile Hotspot may perform measurements for client devices as described in U.S. Ser. No. 15/290,664 in combination with PO monitoring and decoding as per the aspect of the present disclosure. According to an aspect of the present disclosure, the redundant steps performed as described in U.S. Ser. No. 15/290,664 and the present disclosure may be eliminated.

According to an aspect of the present disclosure, a mobile Hotspot may perform SI monitoring and updating as described in U.S. Ser. No. 15/233,488 filed Aug. 10, 2016, and may perform measurements for client devices as described in U.S. Ser. No. 15/290,664 in combination with PO monitoring and decoding as per the aspect of the present disclosure. According to an aspect of the present disclosure, the redundant steps performed as described in U.S. Ser. No. 15/233,488 filed Aug. 10, 2016, and in U.S. Ser. No. 15/290,664 and the present disclosure may be eliminated.

Although the term "mobile Hotspot" is used herein to describe the various aspects of the present disclosure, the disclosure may be applicable to any Hotspot that may be using a WWAN and the Hotspot may not necessarily be mobile. Furthermore, the connectivity between the Hotspot device and the client devices may not necessarily be SRWL. For example, the Hotspot device and the client devices may be communicating over a wired connection such as Universal Serial Bus (USB), Universal Asynchronous Receiver/Transmitter (UART), Inter-Integrated Circuit (I2C), General Purpose Input/Output (GPIO), Ethernet cables, etc. In one example of connectivity, the client devices may be connected to the Hotspot over Ethernet for internet connection but may continue to use the WWAN for other services. In this case the Hotspot may use its own WWAN modem to decode the paging messages of the cell on which the client device is camped and provide any matching paging records to the client devices over the Ethernet. In another example, a client device may be connected to a Personal Computer (PC) that has a built-in WWAN modem. The client device may be connected to the PC over a USB cable for charging and/or transferring music, images, videos, etc. between the PC and the client device. In this case, the PC may be in the equivalent role of a Hotspot. The PC may use its WWAN modem to decode the paging messages on the POs for the cell on which the client device is camped and provide any matching paging records to the client devices over the USB cable.

What is claimed is:

1. A method for communication of paging information in a wireless communication network, the method comprising:
controlling, by a processing device at a hotspot device,
when the hotspot device and a client device are determined to be currently camped on a same cell by being synchronized to the same cell of a same Radio Access Technology (RAT) type on a same frequency,
monitoring and decoding a paging message from a given base station of a given cell of a Wireless Wide Area Network (WWAN) addressed to the client device, wherein the monitoring and decoding includes transmitting a request to the client device for decoding information, in which the decoding information is required for the decoding of the paging message, and receiving the decoding information from the client device; and
entering into a Cellular Paging Decoded and Transmitted over Short Range Wireless Links (SRWL) mode (CPDTOS) with the client device, in which the client device disables paging message decoding processing as long as the client device is connected to and is in the CPDTOS mode with the hotspot device.

2. The method of claim 1, wherein the decoding information includes at least one of a client device identity, a Discontinuous Reception (DRX) cycle or information necessary for the hotspot device to derive a Paging Occasion (PO) of the client device and successfully decode a paging record in the paging message from the WWAN.

3. The method of claim 2, wherein the client device identity includes at least one of an International Mobile Subscriber Identity (IMSI) or a System Architecture Evolution (SAE)-Temporary Mobile Subscriber Identity (S-TMSI).

4. The method of claim 1, further comprising:
controlling, by the processing device at the hotspot device,
when the currently camped on cell for the hotspot device or the client device is changed, communication with the client device to determine whether to continue in or exit the CPDTOS mode with the client device.

5. The method of claim 1,
wherein the hotspot device is configured to connect with a plurality of first client devices including the client device over the SRWL and enter the CPDTOS mode with more than one of the first client devices concurrently,
the method further comprising controlling, by the processing device at the hotspot device,
receiving a Paging Details Information Response message from each of a plurality of second client devices of the first client devices;
determining a Paging Occasion (PO) time instance for each of the second client devices;
when a determination is the PO time instances do not overlap with each other or other scheduled downlink processing for the WWAN at the hotpot device,
transmitting an Enter CPDTOS mode Request message to each of the second client devices to enter the CPDTOS mode;
when at least one third client device of the second client devices determined to be camped on to a same first cell, Cell $C_a$, of a same first RAT type, on a same first frequency, has the PO time instance overlapping with another PO time instance at the hotspot device, transmitting an Enter CPDTOS mode Request message to the at least one third client device having the PO time instance thereof overlapping the another PO time instance at the hotspot device and using a single PO time instance to decode more than one given client device paging message; and
transmitting the Enter CPDTOS mode Request messages only to at least one fourth client device of the second client devices for which the PO time instance thereof is determined not to overlap with any given PO time instance at the hotspot device.

6. The method of claim 1,
wherein the hotspot device is configured to connect with a plurality of first client devices including the client device over the SRWL and enter the CPDTOS mode with more than one of the first client devices concurrently,
the method further comprising controlling, by the processing device at the hotspot device,
when the hotspot device and at least one second client device of the first client devices are currently camped on to different cells $C_a$ and $C_b$, respectively, of a same first RAT type on a same first frequency,
determining whether a paging message from the cell $C_b$ is decodable,
when a determination is the paging message from the Cell $C_b$ is not decodable, not initiating entry into the CPDTOS mode for the at least one second client device, and maintaining or entering into the CPDTOS mode with at least one third client device of the first client devices determined to be camped on to the cell $C_a$;
when a determination is the paging message from the Cell $C_b$ is decodable, initiating entry into the CPDTOS mode for the at least one second client device by transmitting an Enter CPDTOS mode Request" to the at least one second client device and receiving from the at least one second client device an Enter CPDTOS mode Confirm message;
when the Enter CPDTOS mode Confirm message is received from the at least one second client device, decoding the paging message respectively of the at least one second client device in a respective Paging Occasion (PO) time instance and determining whether a paging record matches with an identity of the at least one second client device in a decoded paging message;
when a given paging record is determined to match with the identity of a given client device of the second client devices, transmitting a Matching Paging Record Received Indication message to the given client device; and
when an Exit CPDTOS mode Request message, transmitted by the given client device when the given client device is in an idle mode of operation, is received at the hotspot device, transmitting the Exit CPDTOS mode Response message to the given client device and stopping the monitoring and decoding the PO corresponding to the given client device.

7. The method of claim 6, further comprising,
controlling, by the processing device at the hotspot device,
when a cell reselection is determined at the hotspot device, communication with the at least one second client device to determine whether to continue in or exit the CPDTOS mode with the at least one second client device.

8. The method of claim 1,
wherein the hotspot device is configured to connect with a plurality of first client devices including the client device over the SRWL and enter the CPDTOS mode with more than one of the first client device concurrently,
the method further comprising controlling, by the processing device at the hotspot device, when the hotspot device and at least one second client device of the first client devices are currently camped on cells $C_{f1}$ and $C_{f2}$ of a same first RAT type on different frequencies f1 and f2, respectively,
determining whether a paging message from the cell $C_{f2}$ is decodable while the hotspot device is monitoring the frequency f1;
when the hotspot device determines that the paging message from the cell $C_{f2}$ is not decodable, not initiating entry into the CPDTOS mode for the at least one second client device; and
when the hotspot device determines that the paging message from the cell $C_{f2}$ is decodable, entering into the CPDTOS mode with the at least one second client device and monitoring a Paging Occasions (PO) and decoding given paging message from the cell $C_{f2}$.

9. The method of claim 8, further comprising,
when the hotspot device determines that the paging message from the cell $C_{f2}$ is not decodable, controlling, by the processing device at the hotspot device, maintaining the CPDTOS mode with each third client device of the at least one second client device (i) camped on the cell $C_{f1}$ or (ii) camped on a cell other the cell $C_{f1}$ on the frequency f1.

10. The method of claim 9, further comprising,
when the hotspot device determines that the paging message from the cell $C_{f2}$ is not decodable, controlling, by the processing device at the hotspot device, decoding the paging message in the respective PO time instance and in the decoded paging message determining whether a given paging record matches with an identity of given client device of the at least one second client device; and
when a determination is the given paging record matches an identity of the given client device, transmitting a Matching Paging Record Received Indication message to the given client device.

11. The method of claim 10, further comprising:
controlling, by the processing device at the hotspot device,
receiving an Exit CPDTOS mode Request message from the given client device, which the given client device transmits in response to the Matching Paging Record Received Indication message and a determination to exit idle mode of operation and the CPDTOS mode with the hotspot device; and
transmitting, based on the Exit CPDTOS mode Request message, an Exit CPDTOS mode Response message to the given client device and stopping monitoring and decoding the PO corresponding to the given client device.

12. The method of claim 8, further comprising,
controlling, by the processing device at the hotspot device,
when a cell reselection is determined at the hotspot device, communication with the at least one second client device to determine whether to continue in or exit the CPDTOS mode with the at least one second client device.

13. The method of claim 1, further comprising,
wherein the hotspot device is configured to connect with a plurality of first client devices including the client device over the SRWL and enter the CPDTOS mode with more than one of the first client device concurrently,
the method further comprising controlling, by the processing device at the hotspot device, when the hotspot device and at least one second client device of the first client devices are currently camped on cells $C_{RAT1}$ and $C_{RAT2}$ of different first and second RAT types RAT1 and RAT2, respectively,
determining whether (i) the RAT2 and frequencies used by the RAT2 are supported by the hotspot device, and (ii) a paging message from the cell $C_{RAT2}$ is decodable while the hotspot device is monitoring the cell $C_{RAT1}$ of the RAT type RAT1; and
when the hotspot device determines that the paging message from the cell $C_{RAT2}$ is not decodable, not initiating entry into the CPDTOS mode for the at least one second client device; and
when the hotspot device determines that the paging message from the cell $C_{RAT2}$ is decodable, entering into the CPDTOS mode with the at least one second client device and decoding given paging messages of the at least one second client device in respective Paging Occasions (POs) time instances, determining from the decoded given paging messages whether a given paging record matches with an identity of the at least one second client device; and
when a determination is a given paging record matches the identity of at least one third client device of the at least one second client device, transmitting a Matching Paging Record Received Indication message to the at least one third client device.

14. The method of claim 13, further comprising,
when the hotspot device determines that the paging message from the cell $C_{RAT2}$ is not decodable, controlling, by the processing device at the hotspot device, maintaining the CPDTOS mode with each third client device of the at least one second client device camped on (i) the cell $C_{RAT1}$ or (ii) a cell other the cell $C_{RAT1}$ having the RAT type RAT1 and a same or different frequency as the cell $C_{RAT1}$.

15. The method of claim 13, further comprising:
controlling, by the processing device at the hotspot device,
receiving an Exit CPDTOS mode Request message from the at least one third client device, which the at least one third client device transmits in response to the Matching Paging Record Received Indication message and a determination at the at least one third client device to exit idle mode of operation and the CPDTOS mode with the hotspot device; and
transmitting, based on the Exit CPDTOS mode Request message, an Exit CPDTOS mode Response message to the at least one third client device and stopping monitoring and decoding the PO corresponding to the at least one third client device.

16. The method of claim 13, further comprising,
controlling, by the processing device at the hotspot device,
when a cell reselection is determined at the hotspot device, communication with the at least one second client device to determine whether to continue in or exit the CPDTOS mode with each of the at least one second client device.

17. The method of claim 1,
wherein the hotspot device is configured to connect with a plurality of first client devices including the client device over the SRWL and enter the CPDTOS mode with more than one of the first client device concurrently, and
the method further comprising controlling, by the processing device at the hotspot device,
when a determination is the hotspot device in agreement with the first client devices on monitoring and decoding of paging messages for given agreed client devices of the first client devices camped on a same cell or different cells on different frequencies or different RAT types, monitoring Paging Occasions (POs) in downlink for each given agreed client device of the different frequencies and the RAT types and managing a downlink monitoring schedule for the different cells respectively.

18. The method of claim 1, further comprising,
wherein the hotspot device is configured to connect with a plurality of first client devices including the client device over the SRWL and enter the CPDTOS mode with more than one of the first client device concurrently, and
the method further comprising controlling, by the processing device at the hotspot device, when an overlap in Paging Occasions (POs) of different cells in same or different frequencies and RAT types is determined for at least one second device of the first client devices,
transmitting a Paging Details Information Request message requesting the at least one second client device to change a Discontinuous Reception (DRX) cycle so as to determine whether a change in the DRX cycle changes the POs at the at least one second client device to avoid the overlap in the POs;
receiving a Paging Details Information Response message from the at least one second client device, when the DRX cycle of the at least one second client device is changed; and
when a determination at the hotspot device is there are not any non-overlapping POs for the at least one second client device camped on a second given cell of the same or different frequencies and RAT types, communicating a result of the determination to the at least one second client device and not entering or exiting the mode for the at least one second client device.

19. The method of claim 1, further comprising,
wherein the hotspot device is configured to connect with a plurality of first client devices including the client device over the SRWL and enter the CPDTOS mode with more than one of the first client device concurrently, and
the method further comprising controlling, by the processing device at the hotspot device, when a determination at the hotspot device is an overlap with Paging Occasions (POs) of second given cells of a same or different frequencies and RAT types to be monitored for at least one second client device of the first client devices with which the hotspot device is in the CPDTOS mode, based on an attempt by the hotspot device to decode paging message for the at least one second client device, executing one of:
1) prioritizing third given cells of the same frequency and RAT type to which the hotspot device is camped on; and
for other cells on other frequencies and RAT types for which an overlap of POs of at least one third client device of the first client device is determined, communicating to the at least one third client device that decoding of a next PO for at least one third client device is uncertain, requesting the at least one third client device to perform PO decoding and continuing to be in the CPDTOS mode with the at least one third client device;
2) prioritizing PO decoding of cells having frequencies and RAT types other than a frequency and RAT type of cells on which the hotspot device is camped and deferring system information (SI) decoding of the cells on which the hotspot device is camped, and determining whether to defer the SI decoding when delayed decoding of the SI is determined not to impact normal operation and performance of the hotspot device;
3) determining a priority for deciding which of given client devices the PO can be monitored and which other client devices the PO monitoring can be cancelled, based on a priority request from a given client device determined based on a current state of the given client device for PO monitoring; and
4) when the PO overlap is detected at the hotspot device, deciding using predetermined priorities set on client devices and at least one of RAT types or the frequencies for PO monitoring, at least one third client device for which to monitor the PO and at least one fourth client device for which to cancel monitoring of the PO.

20. The method of claim 19,
wherein, when 1) is executed:
when the request for the PO decoding and to continue to be in the CPDTOS mode is denied by the at least one third client device, controlling, by the processing device at the hotspot device, exiting the CPDTOS mode with the client device; and
controlling, by the processing device at the hotspot device, when an ongoing SI decode is completed at the hotspot device and non-overlapping POs are determined for at least one given client device of the first client devices for which the hotspot device previously exited the CPDTOS or the CPDTOS mode is not entered because the overlap in the PO previously due to the SI decode, transmitting a WWAN Camped on Cell Information Request or an Enter CPDTOS mode request to the at least one given client device requesting entry into the CPDTOS mode.

21. The method of claim 19,
in which the priority request is based on battery level of a battery operated client device having a predetermined battery level and (ii) a comparison to another client device for which power saving is not considered and which monitors own PO.

22. The method of claim 19,
in which the priority request is communicated in a Paging Details Information Response message.

23. The method of claim 1, further comprising:
controlling, by the processing device at the hotspot device,
  transmitting, to the client device, in a WWAN Camped-on Cell Information Request message, information on Cell $C_x$, on which the hotspot device is currently camped, including at least one of first RAT type, first frequency or first Cell Identity (CID); and
  when a WWAN Camped-on Cell Information Response message is received from the client device, in which the WWAN Camped-on Cell Information Response message is transmitted by the client device when the client device determines a relative time offset exists between Cell $C_y$, on which the client device is camped and the Cell $C_x$ and indicates an estimate of a relative time offset between the Cell $C_y$ and the Cell $C_x$, using the estimate of the relative time offset to expedite timing synchronization with the Cell $C_y$ and increase speed of decoding paging message in the Cell $C_y$.

24. The method of claim 1,
wherein the hotspot device is configured to connect with a plurality of first client devices including the client device over the SRWL and enter the CPDTOS mode with more than one of the first client device concurrently, and
the method further comprising controlling, by the processing device at the hotspot device, when the hotspot device includes M receiver/decoder circuits, decoding in parallel overlapping Paging Occasions (POs) and system information (SIs) from N cells of same or different frequencies and RAT types, in which M and N are the same or different.

25. The method of claim 1, further comprising:
controlling, by the processing device at the hotspot device, at any point of time, communicating with the client device and exiting the CPDTOS mode.

26. The method of claim 5, further comprising:
controlling, by the processing device at the hotspot device, when the hotspot device fails to decode a given paging message in any given Paging Occasion (PO) for the client device, notifying the client device of the failure to decode and exiting the CPDTOS mode with the client device.

27. The method of claim 1, further comprising:
controlling, by the processing device at the hotspot device,
when given paging messages in respective Paging Occasion (PO) time instances are decoded at the hotspot device and a determination is a paging record for the client device has no match in a given decoded paging message, transmitting a No Matching Paging Record Received Indication message to the client device to indicate to the client device to refresh a counter or timer to continue to maintain status of the client device with the WWAN.

28. The method of claim 27, further comprising:
controlling, by the processing device at the hotspot device,
transmitting a Matching Paging Record Received Indication message to the client device when a matching paging record is detected in a given paging message of the client device.

29. The method of claim 1, further comprising:
controlling, by the processing device at the hotspot device,
when a new client device is connected with the hotspot device or system information (SI) in the serving cell of the hotspot device is updated or change and updated SI is successfully decoded at the hotspot device, entering the CPDTOS mode autonomously and starting broadcasting a Paging Details Information Request message.

30. The method of claim 1,
wherein the hotspot device is pre-configured with a set of second cells of same or different frequencies, and given RAT type for which the hotspot device at least one of monitors or decodes Paging Occasions (POs) from the respective second cells.

31. The method of claim 1,
wherein the hotspot device determines whether to transmit a Matching Paging Record Received Indication message to at least one second client device of a plurality first client devices including the client device, with which the hotspot device is configured to connect over the SRWL and enter the CPDTOS mode, using a first application being executed in the hotspot device and a second application being executed in the at least one second client device,
in which the first and second applications communicate through a peer to peer protocol on any logical channel of an SRWL being used,
in which the first and second applications are independent of the SRWL being used and achieved through a first virtual communication port established in the hotspot device and a second virtual communication port established in the at least one second client device, and
in which the SRWL is mapped to the first and second virtual communication ports and the first and second applications communicate using the first and second virtual communication ports.

32. The method of claim 1, further comprising:
controlling, by the processing device at the hotspot device,
creating a new physical or logical channel as a Cellular Paging Message Communication Channel (CPMCC), which is pre-negotiated and dedicated for the CPDTOS mode, in which the CPMCC has a periodicity and time slot in which the hotspot device is to broadcast a Matching Paging Record Received Indication message to at least one second client device of a plurality first client devices including the client device, with which the hotspot device is configured to connect over the SRWL and enter the CPDTOS mode, in which the at least one second client device is to monitor the CPMCC on a predetermined agreed upon periodicity and time slot to receive a paging record from the hotspot device, and
in which the CPMCC is used by the hotspot device and the at least one second client device for cellular network information exchange other than by communication of the Matching Paging Record Received Indication message from the hotspot device to the at least one second client device.

33. The method of claim 1,
wherein the hotspot device includes more than one primary source of internet including at least one of a cable modem or a Wireless Wide Area Network (WWAN) modem.

34. The method of claim 33, wherein the hotspot device uses the cable modem to provide internet service while using the WWAN modem only for monitoring and decoding of Paging Occasions (POs).

35. The method of claim 1, further comprising:
controlling, by the processing device at the hotspot device,
when the hotspot and the client device are in the CPDTOS mode, a cell change occurs in the hotspot device or the client device, the hotspot device is not able to continue the CPDTOS mode with the client device, transmitting an Exit CPDTOS mode Request to and exiting the CPDTOS mode with the client device.

36. The method of claim 1, further comprising:
controlling, by the processing device at the hotspot device,
when the hotspot device and the client device are in the CPDTOS mode, a Paging Occasion (PO) to be monitored for a serving cell of the hotspot device is changed, and the hotspot device is not able to continue the CPDTOS mode with the client device, transmitting an Exit CPDTOS mode Request to and exiting the CPDTOS mode with the client device.

37. The method of claim 1, further comprising:
controlling, by the processing device at the hotspot device,
when a first change in a default Discontinuous Reception (DRX) cycle or paging cycle is detected at the client device, in which the first change is based on detection of a change in a Paging Occasion (PO) of a serving cell of the client device such that the hotspot device is not able to continue to monitor a new PO because of overlap in given PO, is communicated to the hotspot device, transmitting an Exit CPDTOS mode Request to the client device and exiting the CPDTOS mode with the client device.

38. The method of claim 1, further comprising:
controlling, by the processing device at the hotspot device, receiving, over the communication connection, a WWAN broadcast information message transmitted from the client device, responsive to a second WWAN broadcast information message transmitted from the hotspot device,
wherein the first and second WWAN broadcast information messages indicate first and second WWAN capabilities respectively of the hotspot device and the client device.

39. The method of claim 1, further comprising:
controlling, by the processing device at the hotspot device,
receiving a request from a client device to perform measurements on at least one of a serving cell or at least one neighbor cell of the client device indicated on a list transmitted with the request;
determining a neighbor cell measurement schedule for the hotspot device;
determining whether measurements are performable by the hotspot device on at least one second given cell indicated on a list of second cells transmitted with a request from the client device;
when the measurements are determined to be performable for the at least one second given cell, communicating to the client device a positive acknowledgement with an indication of each first cell indicated in the list for which the measurements are determined to be performable; and when the measurement are determined not to be performable on any cell indicated in the list, communicating to the client device a negative acknowledgement with an indication the measurements are determined to be not performable for any of the cells indicated in the list.

40. A method for communication of paging information in a wireless communication network, the method comprising:
controlling, by a processing device at a client device,
when a hotspot device and the client device are determined to be currently camped on a same cell by being synchronized to the same cell of a same Radio Access Technology (RAT) type on a same frequency,
receiving a request from the hotspot device for decoding information, in which the decoding information is required for decoding of a paging message from a given base station of a given cell of a Wireless Wide Area Network (WWAN) addressed to the client device;
transmitting the decoding information to the hotspot device; and
entering into a Cellular Paging Decoded and Transmitted over Short Range Wireless Links (SRWL) mode (CPDTOS) with the hotspot device, and disabling paging message decoding processing as long as the client device is connected to and is in the CPDTOS mode with the hotspot device.

41. The method of claim 40, further comprising:
controlling, by the processing device at the client device,
when the currently camped on cell is changed in the hotspot device or the client device, communication with the hotspot device to determine whether to continue in or exit the CPDTOS mode with the hotspot device.

42. The method of claim 40,
wherein the hotspot device is configured to connect with a plurality of first client devices including the client device over the SRWL and enter the CPDTOS mode with more than one of the first client device concurrently, and
the method further comprising controlling, by the processing device at the client device,
when the hotspot device and at least one second client device of the first client devices are currently camped on to different cells $C_a$ and $C_b$, respectively, of a same first RAT type on a same first frequency,
receiving an Enter CPDTOS mode Request from the hotspot device, when a determination at the hotspot device is a paging message from the Cell $C_b$ is decodable, entering into the CPDTOS mode with the hotspot device and transmitting an Enter CPDTOS mode Confirm message to the hotspot device;
receiving a Matching Paging Record Received Indication message from the hotspot device, when a determination at the hotspot device is a given paging record matches with an identity of the client device in a paging message decoded at the hotspot device; and
analyzing the given paging record and taking action based on contents of the paging record.

43. The method of claim 42, further comprising:
when the given paging record indicates an incoming voice call, controlling, by the processing device at the client device,
determining whether to initiate a procedure for establishing a connection with the respective WWAN;

when the client device is in an idle mode of operation, exiting the CPDTOS mode with the hotspot device and transmitting the Exit CPDTOS mode Request message; and
subsequently when the client reenters idle mode, entering the CPDTOS mode with the hotspot device.

44. The method of claim 43, further comprising:
controlling, by the processing device at the client device,
disabling monitoring and decoding of a Paging Occasion (PO) for the client device as long as the client device is connected to the hotspot device and has entered the CPDTOS mode; and
when a cell reselection is determined in the client device, communication with the hotspot device to determine whether to continue in or exit the CPDTOS mode.

45. The method of claim 40, further comprising,
wherein the hotspot device is configured to connect with a plurality of first client devices including the client device over the SRWL and enter the CPDTOS mode with more than one of the first client device concurrently, and
the method further comprising controlling, by the processing device at the client device,
when the hotspot device and at least one second client device of the first client devices are currently camped on cells $C_{f1}$ and $C_{f2}$ of a same first RAT type on different frequencies f1 and f2, respectively,
receiving a Matching Paging Record Received Indication message, when a determination at the hotspot device is a paging message from the cell $C_{f2}$ is decodable and a determination at the hotspot device is a given paging record matches with an identity of the client device in a paging message decoded at the hotspot device; and
analyzing the given paging record and taking action based on contents of the paging record.

46. The method of claim 45, further comprising:
when the given paging record indicates an incoming voice call, controlling, by the processing device at the client device,
determining whether to initiate a procedure for establishing a connection with a respective WWAN;
when the client device is in an idle mode of operation, exiting the CPDTOS mode with the hotspot device and transmitting the Exit CPDTOS mode Request message; and
subsequently when the client reenters idle mode, entering the CPDTOS mode with the hotspot device.

47. The method of claim 46, further comprising:
controlling, by the processing device at the client device,
disabling monitoring and decoding of a Paging Occasion (PO) for the client device as long as the client device is connected to hotspot device and has entered the CPDTOS mode; and
when a cell reselection is determined in the client device, communication with the hotspot device to determine whether to continue in or exit the CPDTOS mode.

48. The method of claim 40, further comprising,
wherein the hotspot device is configured to connect with a plurality of first client devices including the client device over the SRWL and enter the CPDTOS mode with more than one of the first client device concurrently, and
the method further comprising controlling, by the processing device at the client device, when the hotspot device and at least one second client device of the first client devices are currently camped on cells $C_{RAT1}$ and $C_{RAT2}$ of different first and second RAT types RAT1 and RAT2, respectively,
receiving a Matching Paging Record Received Indication message, when a determination at the hotspot device is a paging message from the cell $C_{RAT2}$ is decodable and a determination at the hotspot device is a given paging record matches with an identity of the client device in a paging message decoded at the hotspot device; and
analyzing the given paging record and taking action based on contents of the paging record.

49. The method of claim 48, further comprising:
when the given paging record indicates an incoming voice call, controlling, by the processing device at the client device,
determining whether to initiate a procedure for establishing a connection with a respective WWAN; and
when the client device is in an idle mode of operation, exiting the CPDTOS mode with the hotspot device and transmitting the Exit CPDTOS mode Request message; and
subsequently when the client reenters idle mode, entering the CPDTOS mode with the hotspot device.

50. The method of claim 49, further comprising:
controlling, by the processing device at the client device,
disabling paging message decoding related processing as long as the client device is connected to the hotspot device and has entered the CPDTOS mode; and
when a cell reselection is determined in the client device, communication with the hotspot device to determine whether to continue in or exit the CPDTOS mode.

51. The method of claim 40, further comprising:
controlling, by the processing device at the client device,
when a determination is the client device is out of range of or disconnected from the hotspot device, exiting the CPDTOS mode and starting decoding a Paging Occasion (PO) according a predetermined standard procedure.

52. The method of claim 40, further comprising:
controlling, by the processing device at the client device,
when the client device is disconnected from the hotspot device and the client device is not able to find another hotspot device for a current location of the client device, starting decoding of Paging Occasions (POs) directly from a Wireless Wide Area Network.

53. The method of claim 40, further comprising:
controlling, by the processing device at the client device,
when the client device enters the CPDTOS mode, turning off a Radio Frequency (RF) receiver of a cellular modem during a Paging Occasion (PO) time slot and entering a power save state.

54. An apparatus for communication of paging information in a wireless communication network, the apparatus comprising:
circuitry at a hotspot device configured to control, when the hotspot device and a client device are determined to be currently camped on a same cell by being synchronized to the same cell of a same Radio Access Technology (RAT) type on a same frequency,
monitoring and decoding a paging message from a given base station of a given cell of a Wireless Wide Area Network (WWAN) addressed to the client device, wherein the monitoring and decoding includes transmitting a request to the client device for decoding information, in which the decoding information is required for the decoding of the paging message, and receiving the decoding information from the client device; and entering into a Cellular Paging Decoded and Transmitted over Short Range Wireless Links (SRWL) mode (CPDTOS) with the client device, in which the client device disables paging message decoding processing as long as the client device is connected to and is in the CPDTOS mode with the hotspot device.

55. A wireless communication device comprising:

a receiver to receive a wireless communication; and a processing device configured for communication of paging information in a wireless communication network, wherein the wireless communication device is a hotspot device, wherein the processing device is configured to control, when the hotspot device and a client device are determined to be currently camped on a same cell by being synchronized to the same cell of a same Radio Access Technology (RAT) type on a same frequency, monitoring and decoding a paging message from a given base station of a given cell of a Wireless Wide Area Network (WWAN) addressed to the client device, wherein the monitoring and decoding includes transmitting a request to the client device for decoding information, in which the decoding information is required for the decoding of the paging message and receiving the decoding information from the client device; and entering into a Cellular Paging Decoded and Transmitted over Short Range Wireless Links (SRWL) mode (CPDTOS) with the client device, in which the client device disables paging message decoding processing as long as the client device is connected to and is in the CPDTOS mode with the hotspot device.

56. An apparatus for communication of paging information in a wireless communication network, the apparatus comprising:

circuitry at a client device configured to control, when a hotspot device and the client device are determined to be currently camped on a same cell by being synchronized to the same cell of a same Radio Access Technology (RAT) type on a same frequency, receiving a request from the hotspot device for decoding information, in which the decoding information is required for decoding of a paging message from a given base station of a given cell of a Wireless Wide Area Network (WWAN) addressed to the client device;

transmitting the decoding information to the hotspot device; and entering into a Cellular Paging Decoded and Transmitted over Short Range Wireless Links (SRWL) mode (CPDTOS) with the hotspot device, and disabling paging message decoding processing as long as the client device is connected to and is in the CPDTOS mode with the hotspot device.

57. A wireless communication device comprising:

a receiver to receive a wireless communication; and a processing device configured for communication of paging information in a wireless communication network, wherein the processing device is configured to control, when a hotspot device and a client device as the wireless communication device are determined to be currently camped on a same cell by being synchronized to the same cell of a same Radio Access Technology (RAT) type on a same frequency, receiving a request from the hotspot device for decoding information, in which the decoding information is required for decoding of a paging message from a given base station of a given cell of a Wireless Wide Area Network (WWAN) addressed to the client device;

transmitting the decoding information to the hotspot device; and entering into a Cellular Paging Decoded and Transmitted over Short Range Wireless Links (SRWL) mode (CPDTOS) with the hotspot device, and disabling paging message decoding processing as long as the client device is connected to and is in the CPDTOS mode with the hotspot device.

* * * * *